Aug. 10, 1965 A. S. WHEELBARGER 3,199,517

FARE BOX WITH SORTER

Filed June 29, 1961 15 Sheets-Sheet 1

INVENTOR

ALBERT S. WHEELBARGER

BY Strauch, Nolan & Neale

ATTORNEYS

M-463

Aug. 10, 1965 A. S. WHEELBARGER 3,199,517

FARE BOX WITH SORTER

Filed June 29, 1961 15 Sheets-Sheet 2

INVENTOR
ALBERT S. WHEELBARGER

BY Strauch, Nolan & Neale
ATTORNEYS
M-463

INVENTOR
ALBERT S. WHEELBARGER
BY Strauch, Nolan & Neale
ATTORNEYS
M 463

INVENTOR
ALBERT S. WHEELBARGER
BY Strauch, Nolan & Neale
ATTORNEYS
M-463

Aug. 10, 1965 A. S. WHEELBARGER 3,199,517

FARE BOX WITH SORTER

Filed June 29, 1961 15 Sheets-Sheet 5

INVENTOR
ALBERT S. WHEELBARGER

BY Strauch, Nolan & Neale

ATTORNEYS
M-463

INVENTOR
ALBERT S. WHEELBARGER

BY Strauch, Nolan & Neale
ATTORNEYS

Aug. 10, 1965 A. S. WHEELBARGER 3,199,517

FARE BOX WITH SORTER

Filed June 29, 1961 15 Sheets-Sheet 7

INVENTOR

ALBERT S. WHEELBARGER

BY Strauch, Nolan & Neale

ATTORNEYS

M-463

INVENTOR
ALBERT S. WHEELBARGER

BY Strauch, Nolan & Neale
ATTORNEYS
M-463

Aug. 10, 1965 A. S. WHEELBARGER 3,199,517

FARE BOX WITH SORTER

Filed June 29, 1961 15 Sheets-Sheet 9

INVENTOR

ALBERT S. WHEELBARGER

BY Strauch, Nolan & Neale

ATTORNEYS

M-463

FARE BOX WITH SORTER

Filed June 29, 1961 15 Sheets-Sheet 10

INVENTOR

ALBERT S. WHEELBARGER

BY Strauch, Nolan & Neale

ATTORNEYS

M-463

INVENTOR

ALBERT S. WHEELBARGER

BY Strauch, Nolan & Neale

ATTORNEYS

M-463

INVENTOR
ALBERT S. WHEELBARGER

BY Strauch, Nolan & Neale
ATTORNEYS
M-463

INVENTOR
ALBERT S. WHEELBARGER

BY Strauch, Nolan & Neale

ATTORNEYS
M-463

INVENTOR
ALBERT S. WHEELBARGER

BY Strauch, Nolan & Neale
ATTORNEYS
M-463

Aug. 10, 1965 A. S. WHEELBARGER 3,199,517

FARE BOX WITH SORTER

Filed June 29, 1961 15 Sheets-Sheet 15

INVENTOR

ALBERT S. WHEELBARGER

BY Strauch, Nolan & Neale

ATTORNEYS

M-463

United States Patent Office 3,199,517
Patented Aug. 10, 1965

3,199,517

FARE BOX WITH SORTER

Albert S. Wheelbarger, Statesboro, Ga., assignor, by mesne assignments, to Farebox Corporation of America, Inc., a corporation of Kansas Filed June 29, 1961, Ser. No. 120,641
27 Claims. (Cl. 133—3)

The present invention relates to coin handling devices and more particularly to an improved coin sorting and distributing device and its combination with a coin gauging mechanism which, for example, can be embodied in a fare collecting apparatus for use on street railways, buses and the like.

The usual subassemblies and combinational organization of the present invention were developed in conjunction with improving fare collecting apparatus of the general type disclosed in United States Letters Patent No. 2,943,631 to Warrick et al., issued July 5, 1960, and will be described with that fare collecting apparatus utilized in the combination. It is to be understood that the invention is applicable to coin handling devices other than fare boxes.

In fare collection boxes, made in accord with structure described in Patent No. 2,943,631, coins or tokens dropped into the box are presented to a singling and gauging mechanism which is automatically operable to initiate a series of cyclic operations resulting in registration of the gauged fares in a registering mechanism. The registering mechanism within the fare box is driven by an electric motor which is started in response to the action of the coins being dropped into the singling mechanism. The motor continues to operate until the coins have cleared the singling and gauging mechanisms and have been registered. After this time, the motor circuit is automatically interrupted to stop the motor until such time that the circuit again is completed by delivery of coins to the singling mechanism. The singling mechanism collects the coins dropped into the fare box and feeds them one at a time to the gauging mechanism which measures the diameter of the coin and actuates the registering mechanism in accordance with the diameter measured to record the value of the coin. After completion of the singling and gauging operations which result in registration, the coins and tokens are singly dropped into a vault or some form of coin receiver which in many instances is so constructed to make coins and tokens available to the operator.

In addition to the foregoing operations, some of the previously known fare boxes also sort and distribute the fares into separate compartments from which the fares are available to the operator, and because continued reliable operation of coin handling devices is of prime importance, most acceptable fare box sorting mechanisms have been made with complex and bulky components in order to assure positive sorting and distribution and to handle overload conditions without being jammed. These machines, being complex and bulky, require more operating power than is usually available from the gauging mechanism. Hence an auxiliary source of power is necessary. Furthermore, complex mechanisms result in increased assembly and repair time, an important cost factor. Others of the previously known machines rely in part upon the mass of the coin to actually achieve sorting (as distinguished from distribution) with reduced complexity of mechanism but, in so doing, these mechanisms are eliminating the factor of positive sorting with increased occurrences of jamming of the sorting mechanism over that which occurs in the more reliable but more complex machines.

The present invention includes a novel automatic sorting mechanism, simplified in construction and easily assembled and repaired. Its location in the sequence of cyclic steps taken by coins passing through a coin handling machine is not subjected to excessive coin loads, thus eliminating a source of jamming. It provides for an accurate and automatic substantially positive distribution of coins and tokens within a desired range of denominations into a change maker conveniently located for access by the operator. Very briefly, the present invention accomplishes the foregoing advantageous operation through the medium of a row of adjacent light-weight sorting or guide fingers individually pivotally mounted in a common narrow flat chute disposed in a common vertical planar form to provide different coin guide chutes for each denomination of coin or token within a selected range passing through a gauging device in the coin handling machine, the sorting fingers deriving their operative power from the coin handling machine and being automatically positioned by the gauging device. The specific guide chute formed by the fingers as a result of the gauging of a coin will provide a path which discharges that coin only into a proper magazine tube of a multi-barrel change maker. Other inventive aspects are present in the coin receiver and in the combination of the singling, gauging, registering, sorting and receiving mechanism and will become clearly apparent from the specific description of this invention.

Accordingly, a primary object of the present invention resides in the provision of a novel and improved automatically controlled coin sorting and distributing device for use with a coin handling apparatus in which a determination of the coin denomination is made.

Another object of the present invention resides in the provision of a new and improved coin sorting and distributing mechanism which is automatically controlled by and derives its operative power from the coin gauging mechanism of a coin singling and gauging apparatus. An ancillary object resides in the provision of this combination mechanism in a fare box. A further object of the present invention is to provide a new and improved fare box coin sorting mechanism having individually shiftable coin guiding elements which are cyclically set and re-set in predetermined order and in timed relation with each cyclic operation of a coin gauging mechanism deriving power from the motor drive to the coin singling and gauging mechanism.

A still further object of the present invention resides in the provision of a novel fare box combination having a motor driven registering mechanism, an automatic coin gauging mechanism controlling the operation of the registering mechanism, and a coin sorting and distributing mechanism automatically controlled by the gauging mechanism, in which combination the gauging mechanism and sorting mechanism are arranged to facilitate the passage of coins in a continuous, consecutive and uninterrupted movement through the fare box which increases its capacity and still positively processes and distributes deposited coins without risk of jamming.

A further object of the present invention resides in the provision in an improved fare box of a novel common motor power source drive connected to operate a coin singling mechanism, a coin registering mechanism and a coin sorting and distributing mechanism.

A further and more specific object of the present invention resides in the provision of a novel coin sorting and distributing mechanism having a row of sorting guide fingers which are automatically shiftable in succession to form between different adjacently disposed fingers any desired one of a plurality of single, distinctly different coin guide chutes depending upon the denomination of individual ones of coins being sorted.

Another object of the present invention resides in the provision of the novel coin sorting mechanism of the preceding object in combination with a singling and gauging apparatus wherein the sorting guide fingers are individually pivotally mounted and spring biased toward their specific coin guiding positions, being cyclically pre-set against spring bias by a drive motor which is the power source for operating, singling and gauging the apparatus.

Still another object of the present invention resides in the provision of an improved fare box incorporating a special coin sorting and distributing mechanism having operative coin guide elements arranged in compact but readily accessible location on an upright frame.

A still further object of the present invention resides in providing a novel simplified spring biased coin gate arrangement which facilitates automatic removal of coins overflowing the magazine tubes of a multi-barrel changemaker to an overflow tray to prevent the jamming of the fare box apparatus by build-up of excess coins.

Further novel features and other objects of this invention will become apparent from the following detailed description, discussion and the appended claims taken in conjunction with the accompanying drawings showing a preferred structure and embodiment, in which:

FIGURE 1 is a partially sectioned front elevational view of a fare box incorporating a preferred embodiment of the present invention and showing the coin sorting mechanism with the front cover removed and with portions of the exterior fare box cabinet broken away to illustrate interior details;

FIGURE 1*a* is a schematic view of the various mechanism embodied in the fare box of FIGURE 1 and showing details of the coin sorting mechanism in cooperation with the common motor drive;

Figure 1:
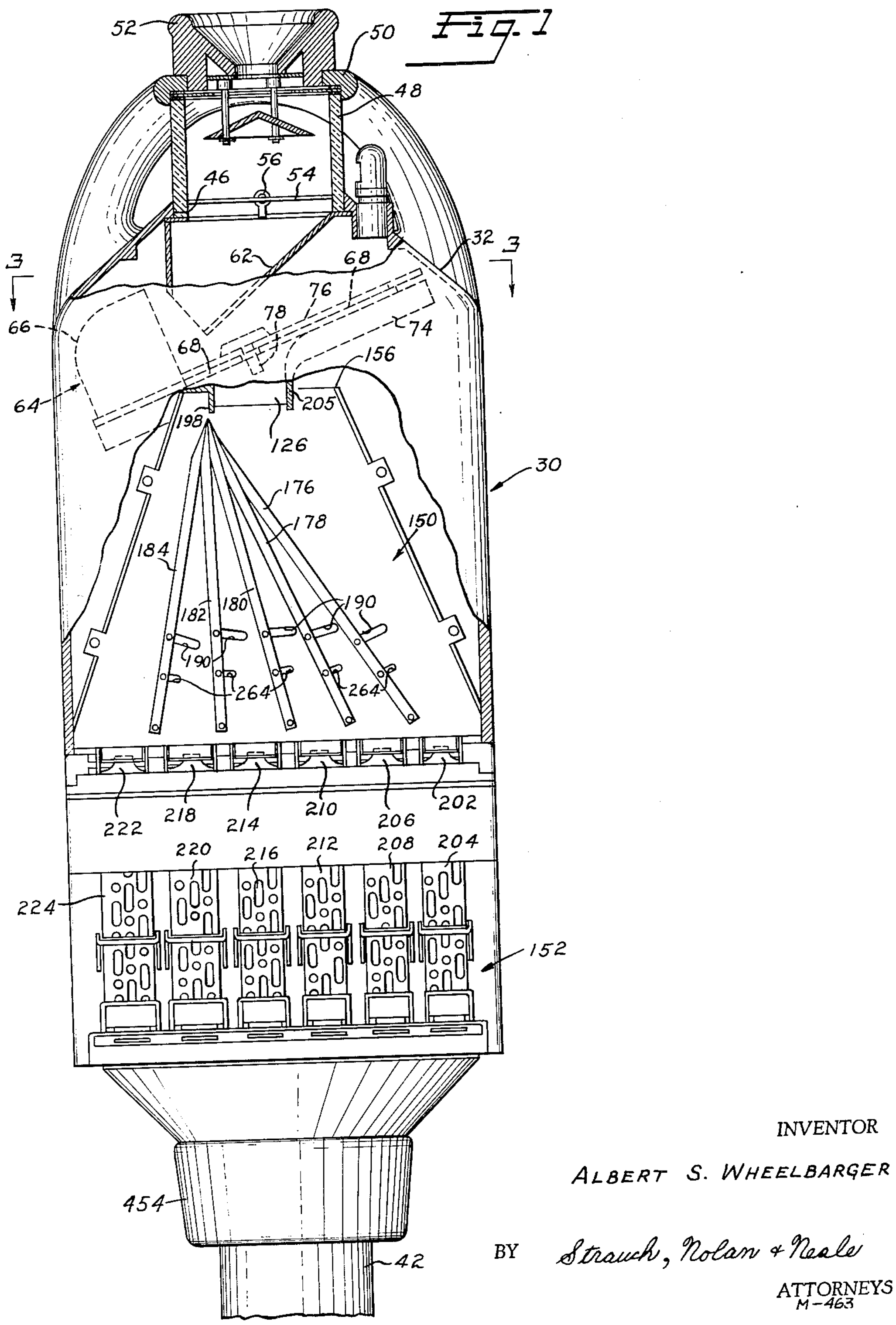
Figure 2:
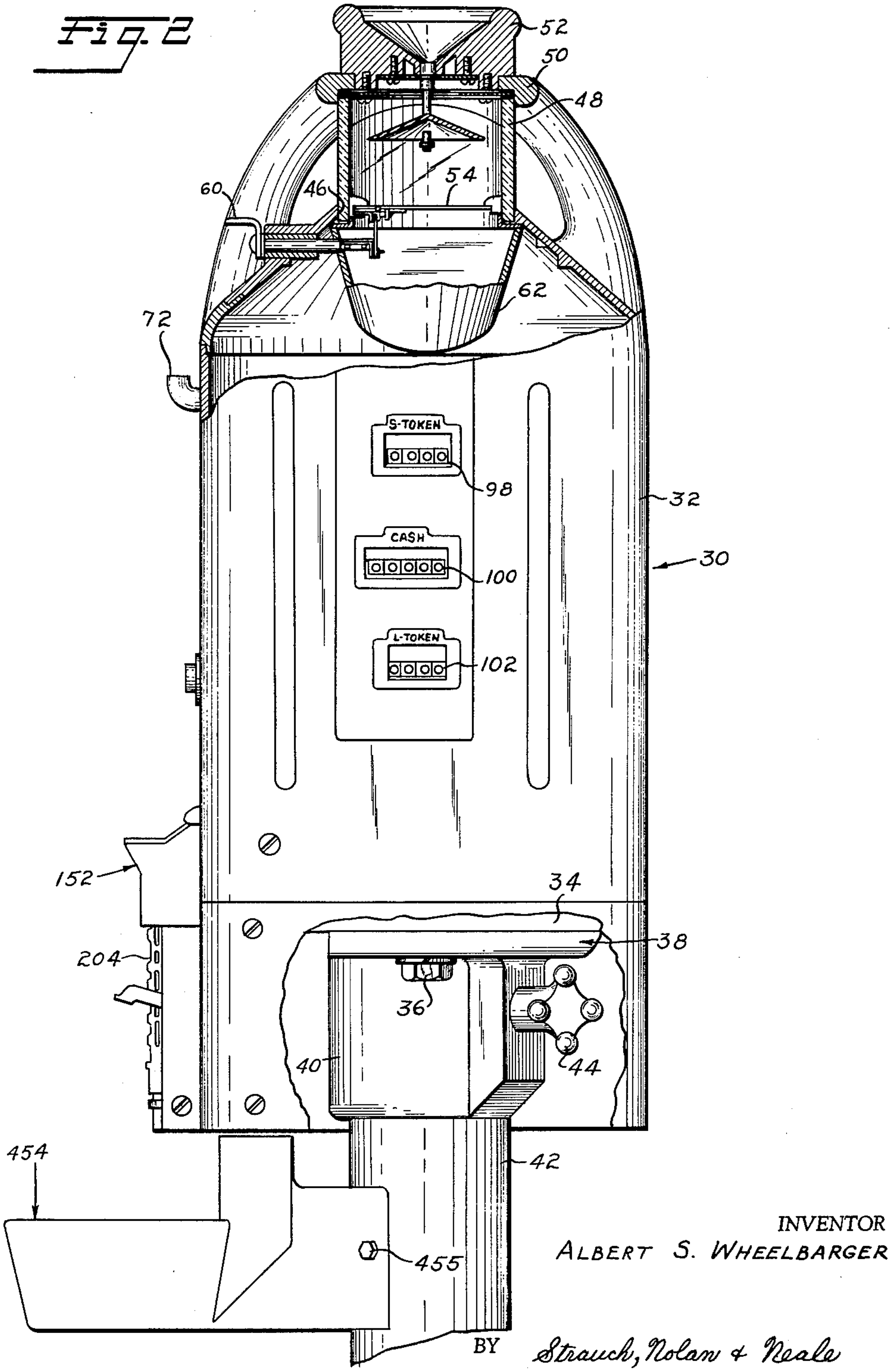
FIGURE 2 is a partially sectioned side elevational view of the fare box shown in FIGURE 1.

Referring now to the drawings and more particularly to FIGURES 1 and 2 showing the construction according to a preferred embodiment of the present invention, the reference numeral 30 generally designates a fare box having an exterior cabinet 32 which encloses the internal fare mechanisms. Cabinet 32 is fixedly secured to an internal frame 34 and essentially is of the same configuration as that shown in Patent No. 2,943,631.

As best shown in FIGURE 2, frame 34 is secured as by bolts 36 (one shown) to a base 38 having a cylindrical boss 40 which receives a support post or pedestal 42 so as to support the fare box at the proper height above the floor. A hand screw 44 actuates a clamp (not shown) to rigidly secure the fare box to pedestal 42.

With continued reference to FIGURES 1 and 2, cabinet 32 is formed with a top centrally located round opening 46 through which the fare is dropped. Opening 46 forms a guide for a cylindrical inspection window 48 which has its upper end received in a central ring 50 formed by cabinet 32. A coin receiving member 52 is mounted in ring 50 above window 48 and guides the coins into the enclosure formed by window 48. The bottom of window 48 is closed by a trap door 54 which is pivotally mounted at 56 and which is spring biased to a horizontal position in the manner shown.

The foregoing description of the fare receiving assembly and inspection window is the same as that disclosed in detail in Patent No. 2,943,631 to which reference is made in the event that a more detailed description than that herein given is found to be necessary for a complete understanding of the invention.

Coins and tokens dropped into coin receiving member 52 collect on door 54. When a number of coins accumulate on door 54, it is tilted about pivot 56 by means of a manually operated lever 60 (FIGURE 2) to drop the coins into a chute 62 which funnels the fare to a coin singling mechanism 64 shown in FIGURES 1 and 3.

Figure 3:
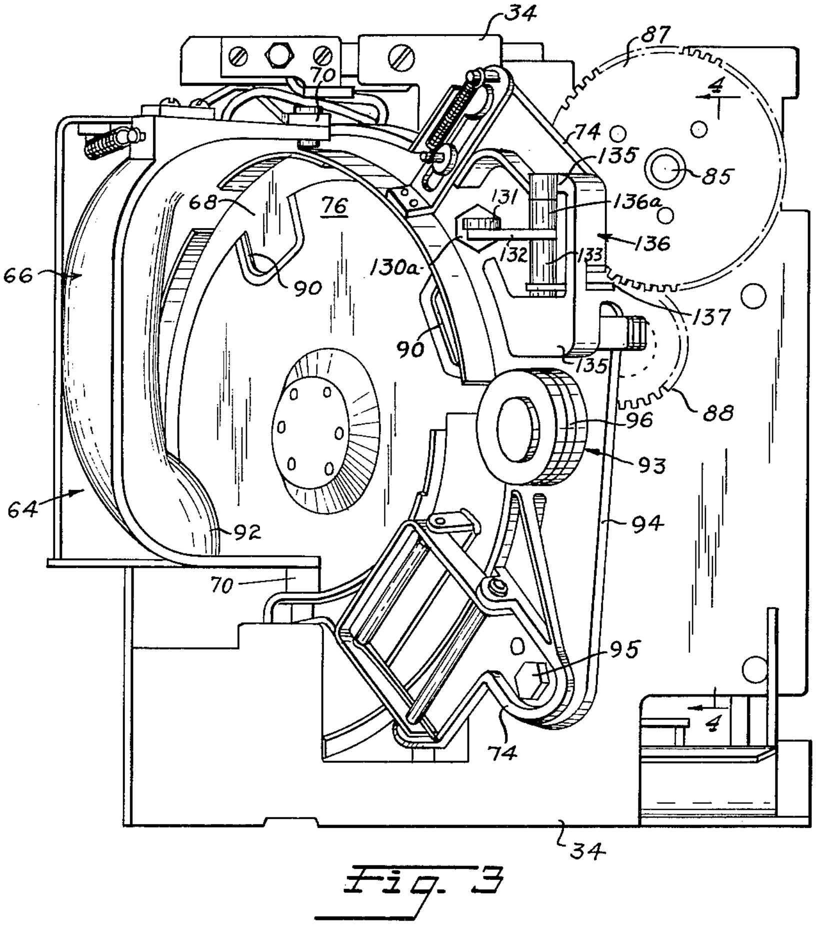
FIGURE 3 is an enlarged section taken substantially along lines 3—3 of FIGURE 1 and showing details of the coin singling mechanism and the coin gauging mechanism with the exterior cabinet removed.
Figure 6:
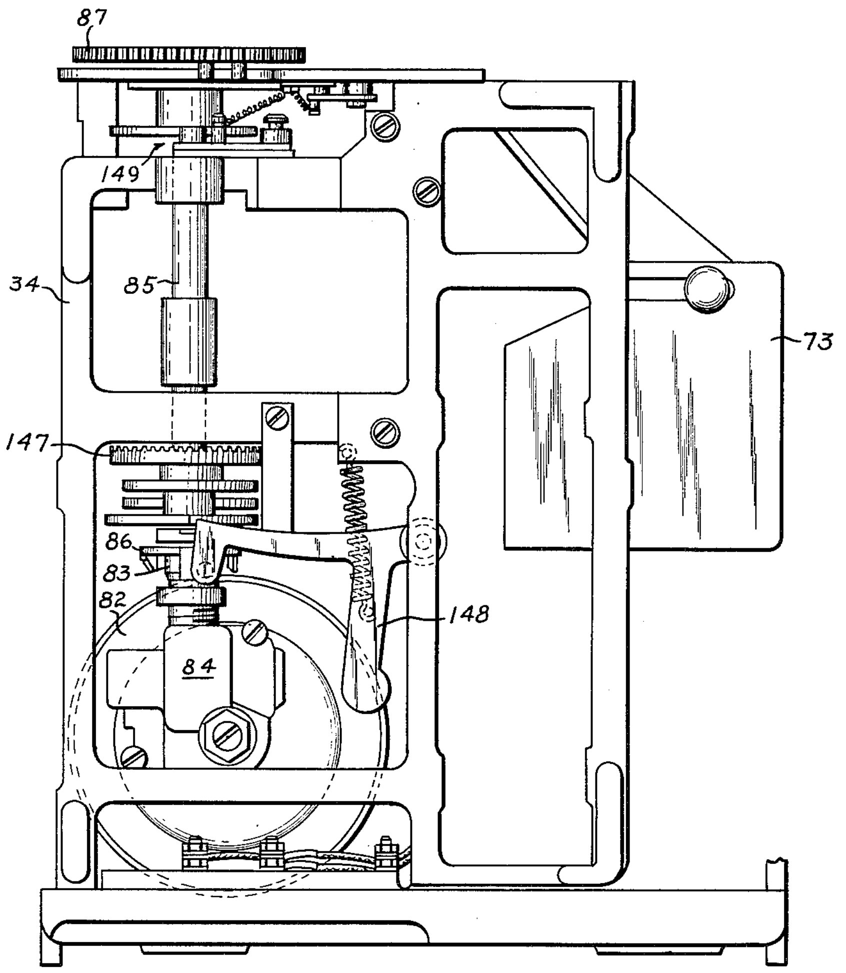
FIGURE 6 is a rear elevational view of the fare box with the exterior cabinet removed and taken substantially along lines 6—6 of FIGURE 5.
Figure 7:
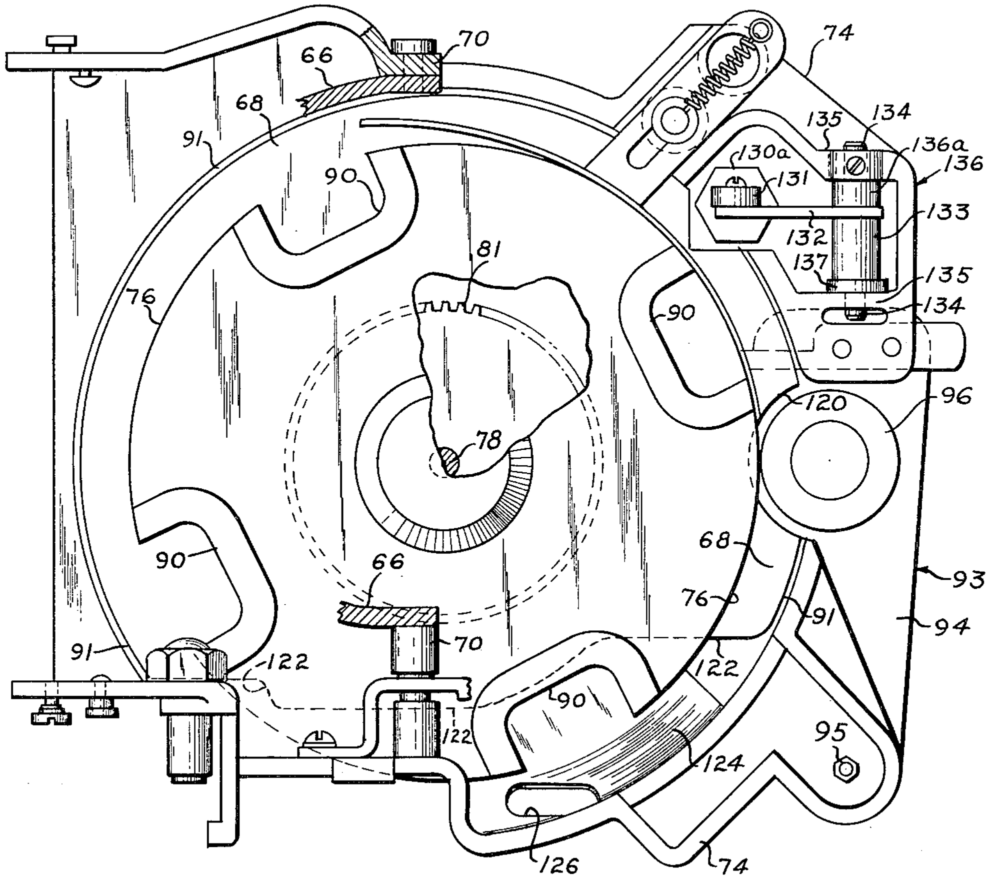
FIGURE 7 is a plan view of the coin singling mechanism and coin gauging mechanism shown in FIGURES 3 and 4.

With reference to FIGURES 1, 3 and 7, coin singling and feeding mechanism 64 is the same as that described in Patent No. 2,943,631 and essentially comprises a hood-shaped coin hopper 66 having a lower edge normally resting on an inclined disc plate 68 to form with plate 68 a basket for receiving coins which descend through chute 62. As explained in Patent No. 2,943,-631, hopper 66 is pivotally mounted at 70 and is arranged to be tilted in a clockwise direction, as viewed from FIGURE 1, by actuation of a manually operable lever 72 (FIGURE 2) such that its lower edge is displaced away from plate 68 to manually discharge coins in hopper 66 into a mutilated coin receptacle 73 (FIGURE 6) beneath the hopper.

With continued reference to FIGURES 1, 3, 4, and 7, plate 68, as fully described in Patent No. 2,943,638, is fixedly mounted on a base plate 74 which is inclined at the same angle with plate 68 and which is fixedly secured to frame 34 in the fare box. Resting on plate 68 is a circular flat-sided coin pick-up plate 76 which is fixed to a shaft 78 journalled in plate 68. Shaft 78 extends below plate 68 and has a gear 81 fixed thereto which is driven by an electric motor 82 (FIGURE 5) through a power train as will now be described.

Figure 5:
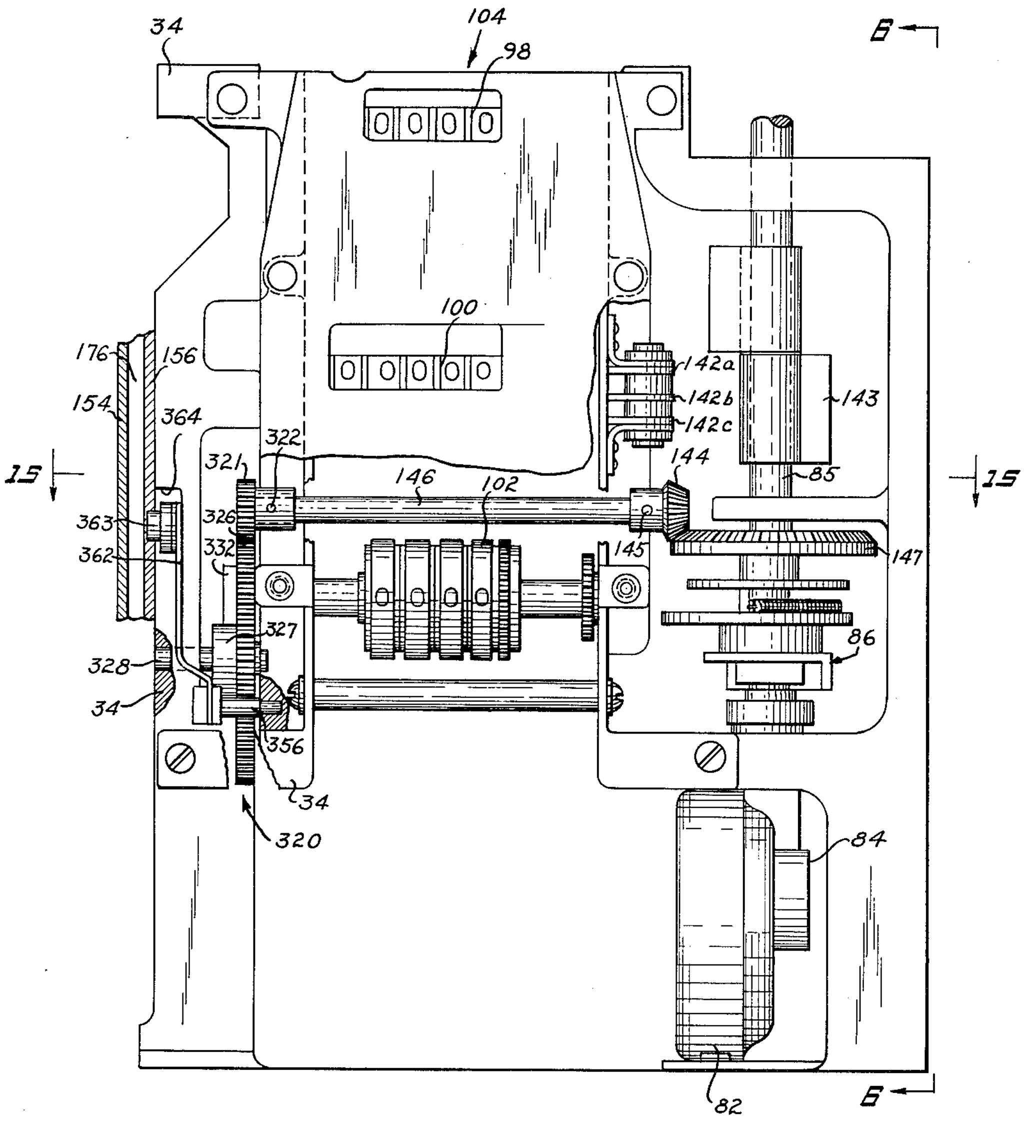
FIGURE 5 is an enlarged fragmentary side elevational view of the fare box in FIGURE 1 with the exterior cabinet removed and interior structural frame work partially broken away to show details of the coin sorter reset mechanism and the fare box registry mechanism and drive therefor.

With reference now to FIGURES 5 and 6, motor 82 is suitably secured to the bottom of frame 34. The output of motor 82, as shown in FIGURE 6, is connected to a vertical drive shaft 83 through a reduction gear box 84. Shaft 83 is journalled at its lower end in gear box 84 and extends upwardly therefrom. Mounted coaxially above shaft 83 is a driven shaft 85 which is journalled in frame 34 and which is releasably connected to drive shaft 83 by means of a clutch mechanism 86 in a manner which is described in detail in Patent No. 2,943,631.

As shown in FIGURES 3 and 6, a gear 87 fixed to the upper end of shaft 85 is coupled to gear 81 through a gear train indicated generally at 88. Gear train 88 which is described in detail in Patent No. 2,943,631 functions to rotate pick-up plate 76 in a clockwise direction about the axis of shaft 78, as viewed from FIGURES 3 and 7, at a reduced rate of displacement such that plate 76 will complete one revolution for every four revolutions of shaft 85 for a purpose as will presently appear.

With continued reference to FIGURES 3 and 7, pick-up plate 76 has a set of four equiangularly spaced coin-carrying recesses 90 formed inwardly of the external periphery thereof. Plate 68 is generally flat sided and, as best shown in FIGURE 7, is generally semi-circular in shape having a curved peripheral section 91 extending radially beyond the outer periphery of pick-up plate 76 so as to form pockets with recesses 90 for retaining coins or tokens in the recesses as pick-up plate 76 is rotated about the axis of shaft 78. The peripheral section 91 extends in a clockwise direction from beneath a coin feed section 92 (FIGURE 3) of hopper 66. Coin feed section 92 is fully described in Patent No. 2,943,631 and as each recess 90 passes under section 92, it picks up a single coin which is pocketed in the recess by the peripheral section 91 and slides along the top surface of plate 68. The coins picked up from hopper 66 are carried in recesses 90 by rotation of plate 76 to a gauging mechanism 93.

Figure 4:
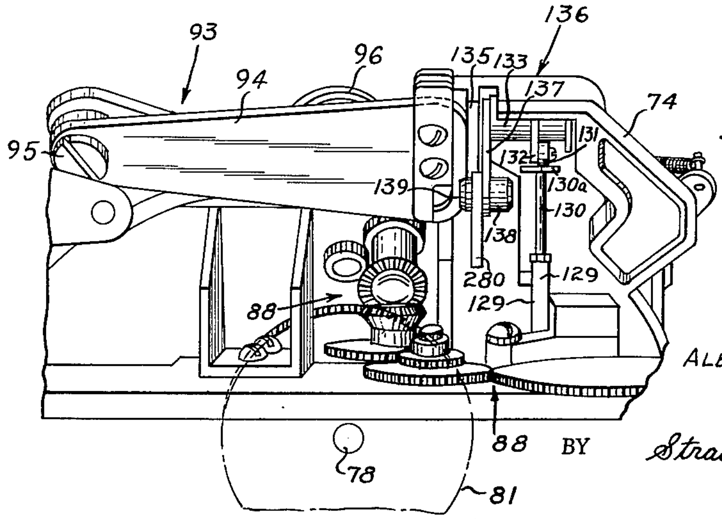
FIGURE 4 is a fragmentary section taken along lines 4—4 of FIGURE 3 on a slightly upwardly inclined plane and showing details of the bottom side of the coin singling mechanism and the coin gauging mechanism.

Gauging mechanism 93 also is the same as that described in Patent No. 2,943,631 and, as best shown in FIGURES 3, 4 and 7, essentially comprises an arm 94 pivotally mounted on a pin 95 fixed to base plate 74 for swinging movement about an axis extending perpendicular to a plane containing pick-up plate 76.

With continued reference to FIGURES 3 and 7, the free end of arm 94 carries a roller 96 which is contained in a plane passing through pick-up plate 76. The coins carried in recesses 90, are fed under roller 96 to swing arm 94 about the axis of pin 95 in a clockwise direction as viewed from FIGURE 3 and by a magnitude dependent upon the diameter of the coin. This movement is transmitted by a motion transmitting train as will be described to control the operation of a set of counters 98, 100 and 102 of a registering mechanism 104 shown in FIGURE 5.

As best shown in FIGURE 7, roller 96 is spring biased, by means as will be presently described, into a semi-circular recess 120 formed inwardly of the outer periphery of plate 68. Roller 96 is positioned in recess 120 immediately adjacent to the external periphery of pick-up plate 76 so that it will be shifted by coins disposed in recesses 90. The curved peripheral section 91 of plate 68 extends to a point circumferentially beyond roller 96 such that roller 96 is positioned intermediate the ends of peripheral section 91. Connecting the ends of section 91 is a generally straight chordially extending peripheral section 122 whch exposes a portion of base plate 74 to the underside of pick-up plate 76.

Thus, the coins picked up by recesses 90 rest on disk plate 68 as they are carried in a clockwise direction from section 92 of hopper 66 to roller 96. The coins in recesses 90 continue to rest on disk plate 68 as they are fed under roller 96 to actuate gauging mechanism 93 and for a short circumferential distance after passing under roller 96. At this point, peripheral section 91 connects to peripheral section 122 which extends beneath pick-up plate 76. By this construction, the coins in recesses 90 tilt out of the recesses and onto base plate 74.

Adjacent to peripheral section 122 and exposed to the underside of pick-up plate 76, base plate 74 is formed with a transition surface 124 which curves and slopes downwardly in a clockwise direction and away from the plane containing pick-up plate 76. Transition surface 124 terminates in a vertical chute 126 which is formed by base plate 74. The curvature of surface 124 is such that it gradually tilts a coin out of recess 90. As the coin nears chute 126, the coin drops completely out of recess 90 and is guided by surface 124 such that it assumes a vertical position and enters chute 126.

With the structure thus far described, it is clear that the coins in hopper 66 are picked up, one at a time, in recesses 90 as each recess passes under hopper section 92 and are carried in recesses 90 in a clockwise direction, as viewed from FIGURES 3 and 7, to roller 96. The coins, still retained in recesses 90 and resting on disk plate 68, pass under roller 96 to pivot arm 94 and actuate registering mechanism 104 in a manner as will be described. The coins then pass over transition surface 124 and are thereby tilted out of their respective recesses 90 to fall, one at a time, into chute 126.

Figure 10:
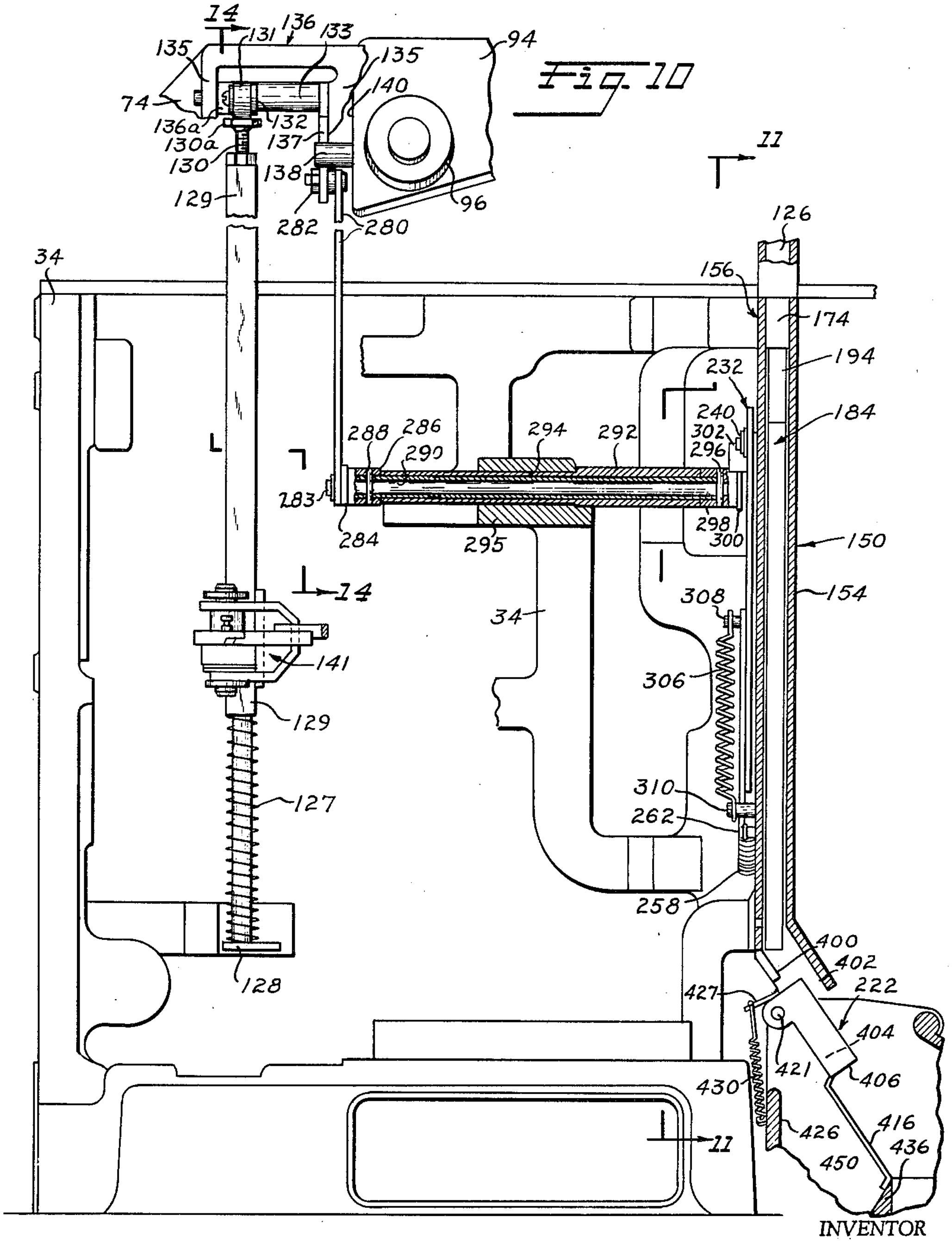
FIGURE 10 is a section taken substantially along lines 10—10 of FIGURE 8.

In order to return gauging roller 96 to its initial position in recess 120 where it is ready to be pivoted by passage of another coin thereunder, a spring 127 is provided for and, as best shown in FIGURE 10 and described in detail in Patent No. 2,943,631, reacts against a ledge 128 formed rigid with frame 34 to biasingly urge a vertical rod 129 upwardly. Rod 129 is suitably slidably mounted in frame 34 and is provided at its upper end with a vertical short post 130 which is adjustably threaded into the upper end of rod 129.

Figure 14:
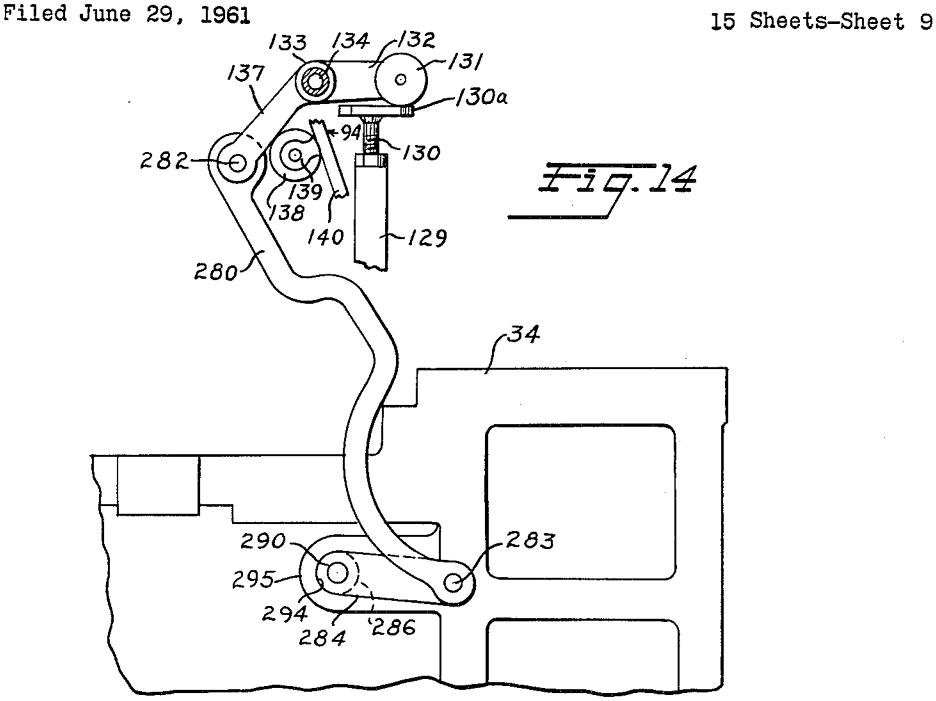
FIGURE 14 is a section taken substantially along lines 14—14 of FIGURE 10.

With reference to FIGURES 3, 4, 10 and 14 and as best shown in FIGURES 10 and 14, post 130 carries a platform 130*a* having a flat top abuttingly engaging the underside of a roller 131 which is rotatably mounted about a horizontal axis on the free end of a rigid flat sided arm 132. This platform construction is modified slightly as compared to the roller engaging structure shown in Patent No. 2,943,631.

Arm 132 is formed rigid with a sleeve 133 which is journalled on a shaft 134 (FIGURE 7). Shaft 134 is fixedly received in coaxial bores formed in parallel spaced apart extensions 135 of a bracket 136 rigidly fixed to base plate 74. Between the extension 135 adjacent to arm 132 and the end of sleeve 133 is an annular spacer 136*a* which is mounted on shaft 134 to retain sleeve 133 axially in place.

With continuing reference to FIGURES 3, 4, 10 and 14, an arm 137 is formed rigid with sleeve 133 in parallel spaced apart relationship to arm 132. As shown, arm 137 is inclined downwardly and away from sleeve 133 and is contained in a plane extending perpendicularly to the rotational axis of sleeve 133. The bottom edge of arm 137 abuttingly engages a horizontal extending roller 138 which is rotatably mounted on a flat sided ear 139 (FIGURE 14) about an axis extending parallel to the rotational axis of sleeve 133.

As best shown in FIGURES 4 and 14, ear 139 is formed integral with gauging arm 94 at an outer edge 140 (FIGURE 10) remote from pivot 95 and slopes downwardly and away from the bottom side face of gauging arm 94.

By this linkage construction, it will be appreciated that spring 127 biases rod 129 vertically upwardly such that platform 130*a* bears against roller 131 to swing arm 132 upwardly to rotate sleeve 133 in a counterclockwise direction as viewed from FIGURE 14. Counterclockwise displacement of sleeve 133 swings arm 137 downwardly to bear against roller 138 and to thereby urge gauging arm 94 toward the periphery of pick-up plate 76 such that as a coin passes beyond gauging roller 96, roller 96 is urged by spring 127 into recess 120.

When gauging arm 94 is pivotally displaced by feeding a coin under roller 96, rod 129 is shifted downwardly against the bias of spring 127 to a position corresponding to the diameter of the coin. As explained in detail in Patent No. 2,943,631, this downward vertical displacement of rod 129 is transferred to registering mechanism 104 to control the actuation of counters 98, 100 and 102 by means of a lever 141 (FIGURE 10) which is carried by rod 129. Lever 141 is positioned by gauging arm 94 opposite one of a system of levers 142*a*, 142*b* and 143*c* (FIGURE 5) depending upon the diameter of the gauged coin. Leaves 142*a*, 142*b* and 142*c* control the actuation of counters 98, 100 and 102 and are selectively depressable by lever 141 to allow the counters to be motor driven for registering the value of the gauged coins.

As fully described in Patent No. 2,943,631, shaft 85 carries a cam 143 (FIGURE 5) which, upon rotation of shaft 85 causes lever 141 to depress one of the levers 142*a*, 142*b* or 142*c* depending upon its position as determined by the diameter of the coin being gauged. Counters 98, 100 and 102, as best shown in FIGURE 5, are driven from a pinion gear 144 which is fixed as by a pin 145 to the right-hand end of a horizontally extending shaft 146 journalled in frame 34. Pinion 144 meshes with a bevel gear 147 fixed to the motor driven shaft 85. Thus when clutch mechanism 86 drivingly connects shaft 85 to shaft 83, motor 82, when energized, drives the register counter selected by depression of one of the levers 142*a*, 142*b* and 142*c* through pinion 144 in the manner fully described in Patent No. 2,943,631.

As explained in detail in Patent No. 2,943,631, coins collected in hopper 66 cause an electrical circuit to be completed to motor 82 thereby energizing motor 82 to drive the various mechanisms in the fare box through at least one cycle of operation. One cycle of operation of the fare box constitutes one complete revolution of pick-up plate 76 which is driven by motor 82 and which will permit up to four coins to be picked up from hopper 66 by the four recesses 90. If there are no coins left in hopper 66 after pick-up plate 76 has made one complete revolution, the electrical circuit to motor 82 is automatically interrupted by means as is described in Patent No. 2,943,631, and clutch mechanism 86 is released by a bell crank mechanism 148 (FIGURE 6) as described in said patent to disengage shaft 85 from shaft 83, thereby allowing motor 82 to coast to a stop.

When shaft 85 is disengaged from shaft 83 by clutch mechanism 86, a cam and follower mechanism 149, as best shown in FIGURE 6 and as described in said patent, cooperates with shaft 85 to prevent shaft 85 from turning beyond its initial starting position thereby assuring that shaft 85 and the component parts driven by shaft 85 are returned to a home or zero position before a subsequent cycle is initiated. If, after a single cycle, coins still remain in hopper 66, shaft 85 and the various mechanisms driven thereby will be automatically re-cycled by motor 82 until there are no coins left in the hopper.

All of the foregoing description of fare box 20 is substantially the same as the fare box structure disclosed in detail in Patent No. 2,943,631 to which reference is made in the event that a more detailed description than that given herein is found to be necessary.

The present invention contemplates a novel and improved automatic sorting mechanism 150 which is simplified in construction, easily assembled and repaired, and less subject to jamming when subjected to excessive coin loads and which provides for an accurate and automatic distribution of a wide denominational range of coins and tokens into a change-maker conveniently located for access by the operator.

Figure 1A:
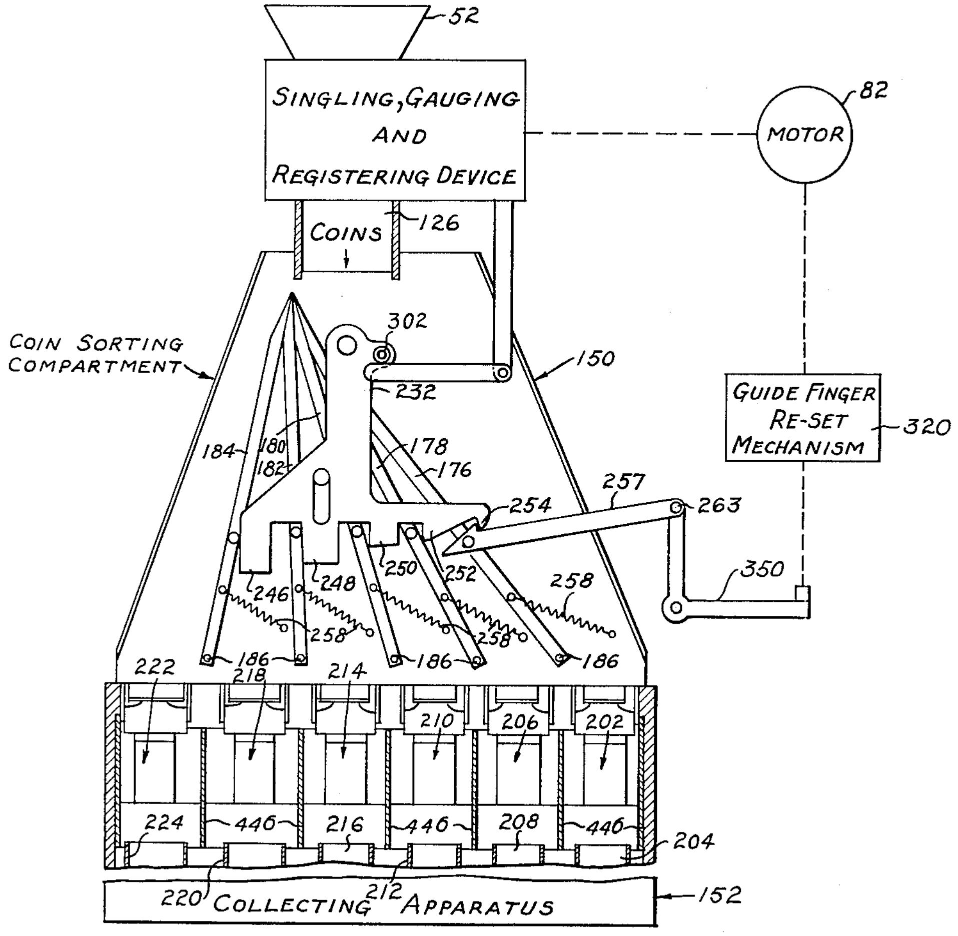

This is accomplished in accordance with the present invention by providing for a row of adjacently disposed sorting or guide fingers which are individually pivotally mounted for consecutive movement in a common vertical plane to form different coin guide chutes for each denomination of coin or token within a predetermined range. As best shown in FIGURE 1*a*, the sorting fingers are automatically positioned by the gauging mechanism of the fare box to form a coin chute between predetermined ones of adjacently disposed fingers depending upon the diameter of the coin presented to the gauging mechanism. The guide chute thus formed is arranged to discharge the coin into its proper magazine tube of a multi-barrel change-maker. Motor 82 which drives the fare box singling mechanism, is operably connected to re-set the guide fingers after the sorting and distribution of each coin.

With the fare box construction according to the present invention, the coins which are dropped into the fare box are successively transferred one at a time in substantially continuous and uninterrupted movement through the gauging mechanism and the sorting and distributing mechanism for deposit in the change-maker. As a result of the continuous uninterrupted movement through the gauging and sorting mechanisms, the registering and distributing operations of the fare box are speeded up so that more coins can be effectively handled within a given time period without causing any of the mechanisms in the box to become overloaded or jammed.

The present invention further contemplates a special device which prevents jamming when one or more of the magazine tubes of a change-maker 152 becomes filled and overflows the top of the tubes to interfere with the operation of the sorting mechanism and eventually clog the fare box. In accordance with the present invention, the excess coins which overflow the tops of the magazine tubes are automatically discharged into an overflow tray by means of a spring biased trap arrangement disposed in the coin chutes which guide the coins from the sorting mechanism to the magazine tubes of the change-maker. As a consequence, coins which overflow the magazine tubes do not build up in the fare box but rather are discharged to the overflow tray to thereby prevent jamming and to be readily available to the operator for re-use in making change.

Figure 8:
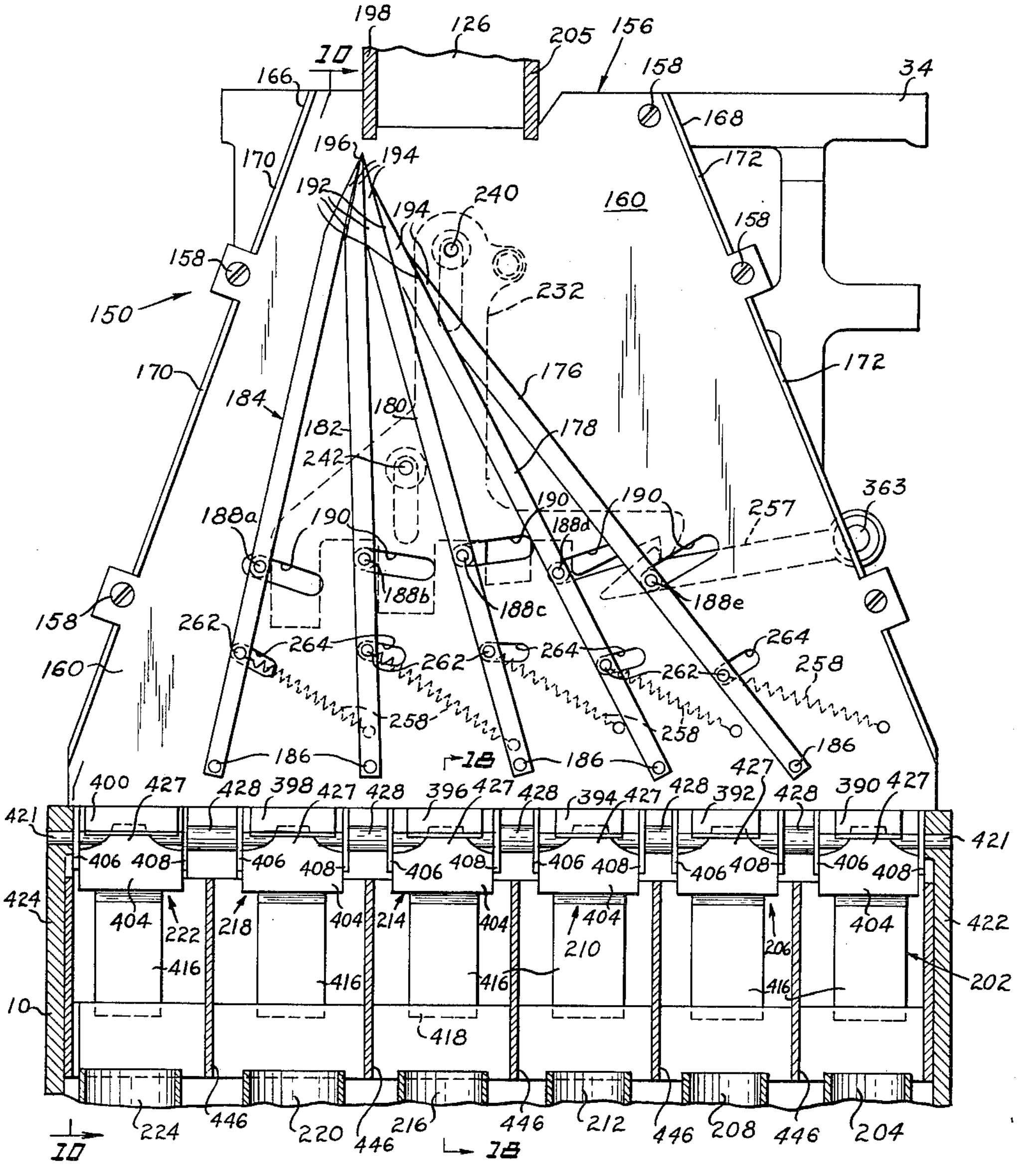
FIGURE 8 is a partially sectioned fragmentary enlarged front elevational view of the coin sorting and distributing mechanism shown in FIGURE 1 and with the front cover plate for the sorting mechanism removed.

In accordance with the present invention and with reference to FIGURES 1, 1a and 8, the coins which are passed through chute 126 are presented to coin sorting and distributing mechanism 150 which automatically sorts coins of different denominations and distributes the coins according to their denomination to separate magazine tubes of the conventional multi-barrel change-maker generally indicated at 152.

Figure 9:
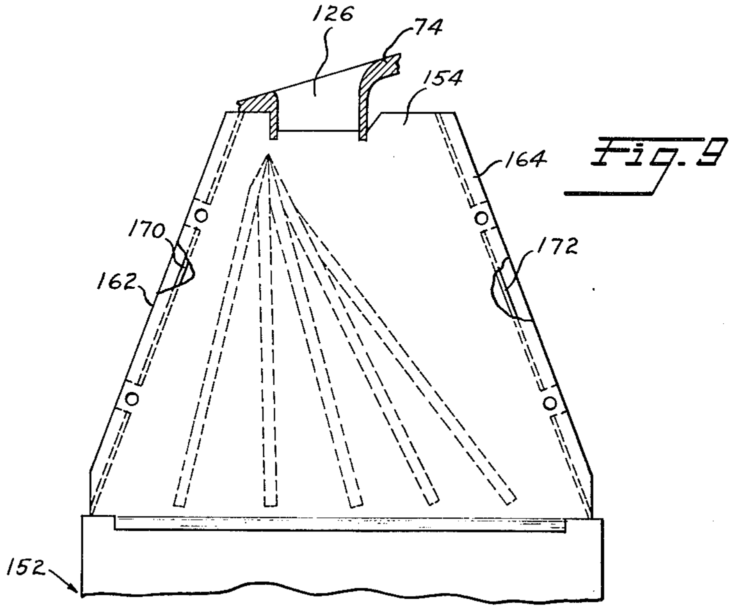
FIGURE 9 is a fragmentary front elevational view similar to the coin sorting and distributing mechanism shown in FIGURE 8 with the front cover plate mounted in place.

With reference to FIGURES 8–10, sorting mechanism 150 is shown to comprise a rigid flat sided vertical front cover plate 154 (FIGURE 9) removably fixed to frame 34 by any suitable means to permit access to the coin guide components of sorting mechanism 150. To the rear of front cover plate 154 a rigid upstanding one-piece finger mounting plate 156 is fixed, as by screws 158 (FIGURE 8), to frame 34 independently of the mounting for front cover plate 154 as best shown in FIGURES 8 and 10. Plate 156 is formed with a vertical flat sided section 160 which extends in parallel spaced apart relationship to front cover plate 154.

As best shown in FIGURES 8 and 9, plate section 160 and plate 154 are formed with essentially the same configuration. Front cover plate 154, as shown in FIGURE 9, has side edges 162 and 164 which converge upwardly toward each other and which have substantially equal slopes. Similarly, plate section 160, as shown in FIGURE 8, has sloping side edges 166 and 168 which converge upwardly toward each other and which are respectively parallel to front plate edges 162 and 164.

As shown in FIGURE 8, the side edges of finger plate 156 are bent over to form, along edges 166 and 168, lips 170 and 172 which extend at right angles between plate section 160 and front plate 154. Lips 170 and 172 completely span the space between plate section 160 and front plate 154 to form with plate section 160 and front plate 154 a partially enclosed coin guide finger compartment 174 (FIGURE 10) which is open at the top and at the bottom. The top of compartment 174 is centrally disposed vertically beneath and in alignment with chute 126 such that coins sliding through chute 126 are guided in a vertical plane into the upper end of compartment 174. The bottom of compartment 174 is disposed over change-maker 152. The space between plate section 160 and cover plate 154 is slightly larger than the thickness of the largest coin to be sorted, such that the opposed wall surfaces of plate section 160 and cover plate 154 forming compartment 174 guide the coin in its descent through compartment 174 and prevent it from tilting out of a vertical plane until the coin reaches the bottom of the compartment.

With this construction, it is clear that coins descending though chute 126 enter at the top of compartment 174 and move downwardly through the bottom opening thereof and into change-maker 152 in a manner as will be presently described in detail.

In order to distribute the coins of different denominations which descend through chute 126 into the proper magazine tube of change-maker 152, a set of five substantially identically shaped elongated coin sorting fingers 176, 178, 180, 182 and 184 are mounted in compartment 174 and, as best shown in FIGURE 8, are disposed in generally upstanding but somewhat tilted positions. Sorting fingers 176, 178, 180, 182 and 184 are individually pivotally mounted near the lower ends thereof on horizontally disposed posts 186 which extend into compartment 174. Posts 186 are fixed to finger plate section 160 and are arranged in predetermined parallel spaced apart relationship such that their axes are in a substantially common horizontal plane extending normal to plate section 160.

Respectively fixed to fingers 176, 178, 180, 182, and 184 above the pivot posts 186 are latch studs 188*a*, 188*b*, 188*c*, 188*d* and 188*e*. Latch studs 188*a*, 188*b*, 188*c*, 188*d* and 188*e* respectively extend through separate slots 190 formed in finger plate section 160. Each slot 190 is slightly inclined and permits free limited movement of each stud 188*a*, 188*b*, 188*c*, 188*d* and 188*e* as sorting fingers 176, 178, 180, 182 and 184 are rotated about their respective axes of pivot posts 186.

With this sorting finger construction, it is clear that fingers 176, 178, 180, 182 and 184 are pivotable in a common vertical plane through limited angular distances about the axes of posts 186 as determined by the length of slots 190. Fingers 176, 178, 180, 182 and 184 are essentially square in cross section with flat side faces and, as shown in FIGURE 10 fill the space between plate section 160 and cover plate 154 with slight clearances at both sides to permit free pivotal displacement about posts 186.

With reference to FIGURE 8, sorting fingers 176, 178, 180, 182 and 184 are shown to be positioned in their extreme counterclockwise positions with studs 188*a*, 188*b*, 188*c*, 188*d* and 188*e* near the left-hand edges of slots 190 such that the sorting fingers extend upwardly toward the bottom of chute 126. The extreme counterclockwise positions of sorting fingers 176, 178, 180, 182 and 184 correspond to a "home" position of coin sorting mechanism which is assumed when motor 82 is de-energized and there are no coins in hopper 66. Slots 190 are arranged such that when fingers 176, 178, 180, 182, and 184 are in their extreme counterclockwise positions, the upper tips of adjacently disposed sorting fingers abut each other.

The upper end of each sorting finger is provided with a tapered surface 192 which faces to the left, as viewed from FIGURE 8, so as to form a triangular tip 194 for each sorting finger.

The tapered surfaces of fingers 176, 178, 180, and 182 respectively abut the flat right sides of fingers 178, 180, 182 and 184 in the "home" position and form a triangular apex, indicated at 196. As shown, apex 196 containing the tips of fingers 176, 178, 180, 182 and 184 is located vertically beneath a left-hand side wall portion 198 of chute 126 and in this position, coins descending from chute 126 pass to the right of apex 196 and between finger 176 and rear plate lip 172. Thus, the coin will be guided between lip 172 and sorting finger 176 to a change-maker chute 202 which is disposed below the sorting fingers and which, in the present embodiment, connects to a "small-token" magazine tube 204 of change-maker 152 in a manner that will be presently described in detail.

The length of each slot 190 is such that when any of the sorting fingers 176, 178, 180, 182 and 184 are pivoted to an extreme clockwise position, as viewed from FIGURE 8, the tip 194 of each pivoted sorting finger will be vertically beneath a right-hand side wall portion 205 (FIGURE 8) of chute 126.

Figure 12:
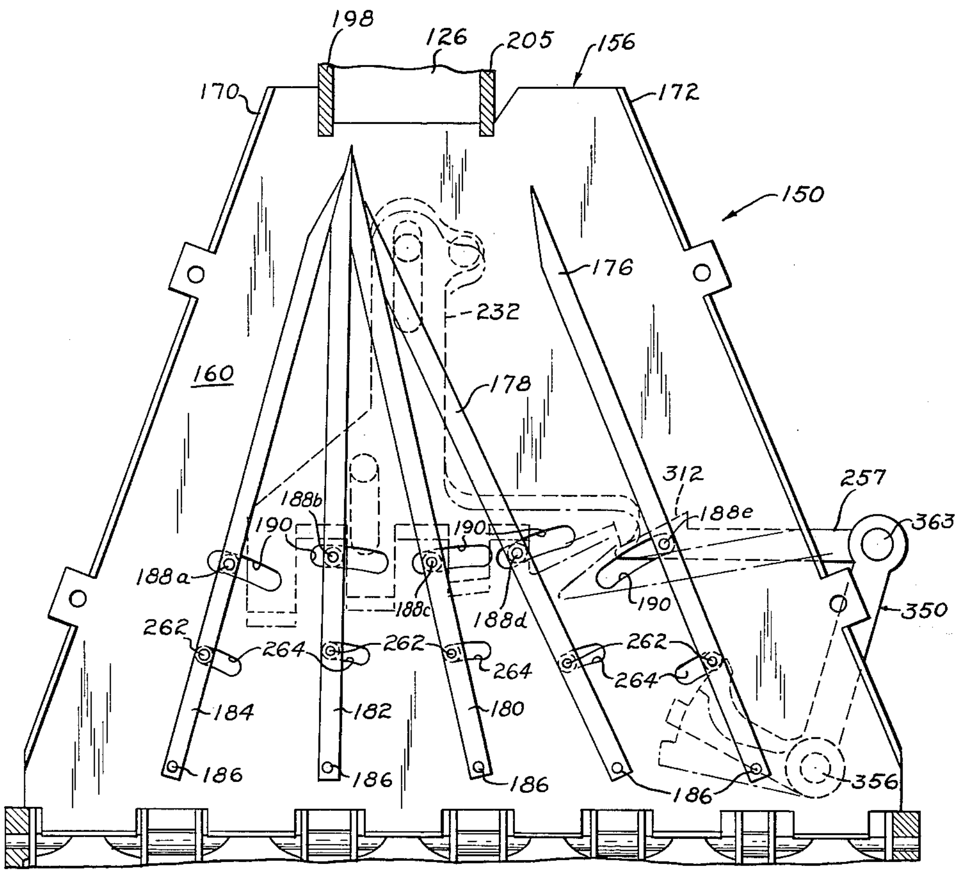
FIGURE 12 is an enlarged partially sectioned fragmentary front elevational view of the coin sorting and distributing mechanism similar to that of FIGURE 8 but with one of the coin sorting fingers displaced to its unlatched position.

FIGURE 12 shows only the sorting finger 176 pivoted to its extreme clockwise position with fingers 178, 180, 182 and 184 remaining in their extreme counterclockwise or "home" positions. By this pivotal displacement of finger 176, it is clear that a guideway is formed by adjacently disposed sorting fingers 176 and 178 such that a coin descending through chute 126 drops between fingers 176 and 178 and is guided by fingers 176 and 178 to a change-maker chute 206 which in the present embodiment connects to a "dime" magazine tube 208 of change-maker 152 in a manner as will be presently described in detail.

Figure 13:
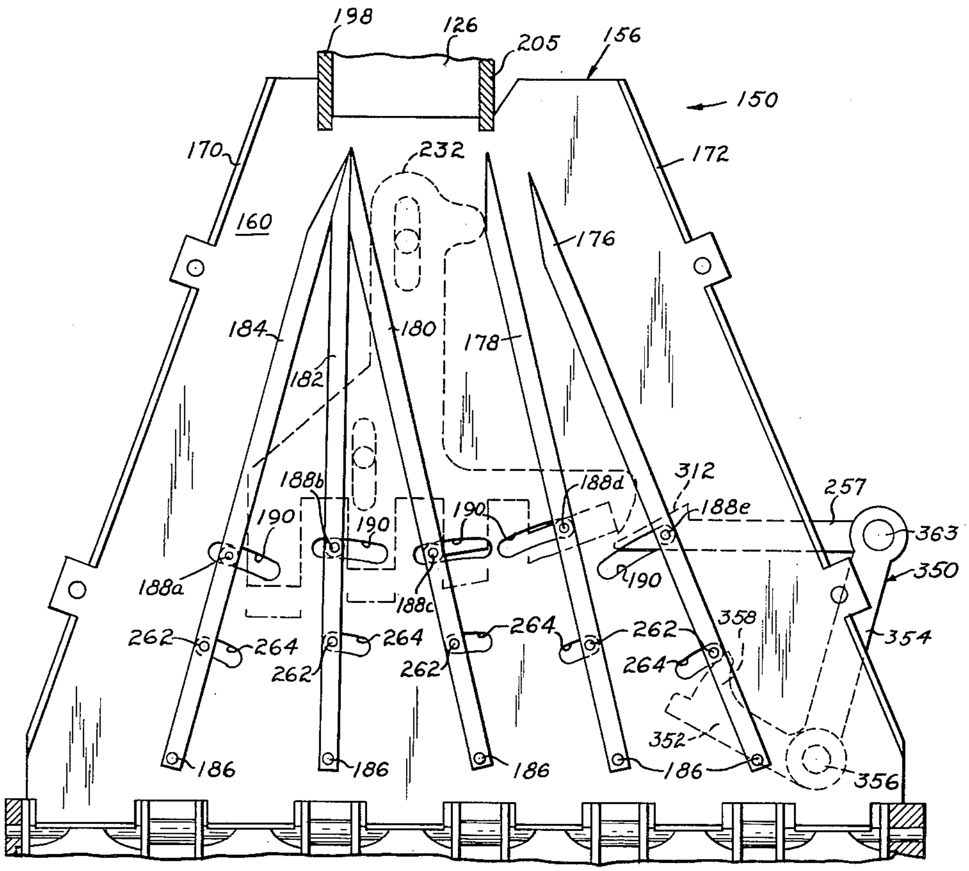
FIGURE 13 is an enlarged fragmentary partially sectioned front elevational view of the coin sorting and distributing mechanism similar to that of FIGURE 8 but with two of the coin sorting guide fingers displaced to their unlatched positions.

As illustrated in FIGURE 13, sorting fingers 176 and 178 are shown to be pivoted to their extreme clockwise positions such that the tips of fingers 176 and 178 are positioned generally vertically below side wall 205 and the tips of fingers 180, 182 and 184 are positioned below side wall 198. Thus, a guideway for a coin descending through chute 126 is formed between sorting fingers 178 and 180 to guide the coin into a change-maker chute 210 which, in the present embodiment, is connected to a "penny" magazine tube 212 of change-maker 152 in a manner as will presently be described in detail.

Similarly, it will be appreciated that when sorting fingers 176, 178 and 180 are pivotally displaced to their extreme clockwise positions, as viewed from FIGURE 8, such that the upper tips of sorting fingers 176, 178 and 180 are disposed generally vertically below side wall 205 of chute 126 while the tips of sorting fingers 182 and 184 remain positioned vertically below side wall 198, a guideway for a coin descending through chute 126 is formed between fingers 180 and 182 to guide the coin into a change-maker chute 214 which, in the present embodiment is connected to a "nickel" magazine tube 216 of change-maker 152 as will be presently described in detail.

When sorting fingers 176, 178, 180 and 182 are pivotally shifted to their extreme clockwise position, as viewed from FIGURE 8, such that the tips of fingers 176, 178, 180, and 182 are all disposed vertically below side wall 205 while the tip of sorting finger 184 remains positioned vertically below side wall 198, a guideway for a coin descending through chute 126 is formed between sorting fingers 182 and 184 to direct the coin into a change-maker chute 218 which, in the present embodiment, is connected to a "large-token" magazine tube 220 of change-maker 152 as will be more fully described.

When all the sorting fingers 176, 178, 180, 182 and 184 are pivotally displaced to their extreme clockwise positions, as viewed from FIGURE 8, such that the tips of all the sorting fingers 176, 178, 180, 182 and 184 are positioned vertically below side wall 205, a guideway is formed between sorting finger 184 and lip 170 for directing the coin into a change-maker chute 222 which, in the present embodiment, is connected to a "quarter" magazine tube 224 of change-maker 152 as will be presently described in detail.

Figure 11:
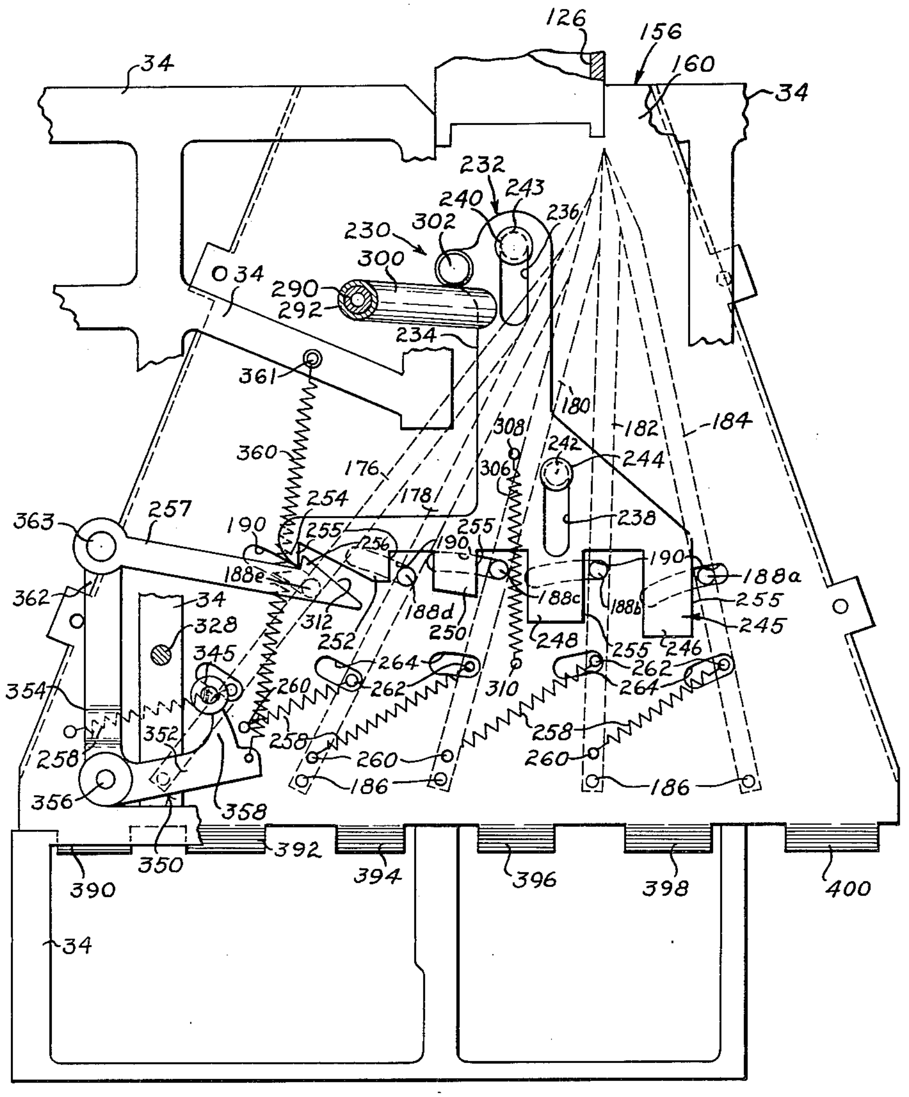
FIGURE 11 is an enlarged fragmentary partially sectioned rear elevational view of the coin sorting and distributing mechanism shown in FIGURE 8 and taken substantially along lines 11—11 of FIGURE 10.

In order to automatically position sorting fingers 176, 178, 180, 182 and 184 such that a coin of a given denomination will be directed into its proper magazine tube of change-maker 152, a sorting finger latching mechanism 230 is provided for and comprises, as best shown in FIGURE 11, an irregularly shaped flat-sided latch plate 232. Latch plate 232 is mounted for limited vertical displacement on the rear side of plate section 160 and is formed with an elongated body portion 234 which has a pair of vertically spaced apart slots 236 and 238. Slots 236 and 238 are of equal length and respectively are formed near the upper and lower ends of body portion 234.

Extending slidably through slots 236 and 238 respectively are horizontally extending cylindrical rollers 240 and 242 which are fixed to the rear side of plate section 160 and which support and guide latch plate 232 for limited vertical movement on finger plate 156. Fixed to the outer ends of rollers 240 and 242 are annular retainers 243 and 244 which retain latch plate 232 against axial displacement along rollers 240 and 242. At its lower end, latch plate 232 is formed with a horizontally extending slotted section 245 which has five downwardly extending spaced apart latching fingers 246, 248, 250, 252 and 254 as best shown in FIGURE 11.

With continued reference to FIGURE 11, latching fingers 246, 248, 250, 252 and 254 are successively shorter proceeding from right to left and are formed with parallel flat vertical latching edges indicated at 255. Latching edges 255 of latching fingers 246, 248, 250 and 252 are arranged to slidably abut studs 188*a*, 188*b*, 188*c* and 188*d* of sorting fingers 184, 182, 180 and 178 as will be presently explained in detail. With the component parts of sorting mechanism 150 positioned as shown in FIGURE 11, latching edge 255 of latching finger 254 slidably abuts an upwardly projecting lip 256 of a latching arm 257 which will presently be described in detail and which is fixed to stud 188*e* of sorting finger 176.

Sorting fingers 176, 178, 180, 182 and 184, as viewed from FIGURE 11, are individually biased in a counterclockwise direction about pivots 186 by means of coil springs 258 which have one end secured to posts 260 fixed to plate section 160 and extending rearwardly thereof. The opposite ends of springs 258 are secured to posts 262 which extend horizontally through slots 264 formed in plate section 160 and which are fixed one to each of the sorting fingers 176, 178, 180, 182 and 184.

By this spring construction, studs 188*d*, 188*c*, 188*b* and 188*a* of sorting fingers 178, 180, 182 and 184 respectively, are biased by springs 258 toward the latching edges 255 of latch fingers 246, 248, 250 and 252. Spring 258 of sorting finger 176 biasingly urges lip 256 to bear against latching edge 255 of latching finger 254 to thereby retain sorting finger 176 in its extreme counterclockwise latched position through the rigid connection provided by stud 188*e* fixed to finger 176 and to arm 257.

As shown in FIGURE 11, studs 188*a*, 188*b*, 188*c* and 188*d* are slightly spaced from the edges 255 of latch fingers 246, 248, 250 and 252, respectively when sorting finger 176 is held in its extreme latched position by latching arm 257. By latching sorting finger 176 in the position shown in FIGURES 8 and 11, the remaining sorting fingers 178, 180, 182 and 184 are held against clockwise movement, as viewed from FIGURE 8, by finger 176. Since springs 258 urge the tips of fingers 178, 180, 182 and 184 into abutment with the finger disposed ahead of it, sorting finger 176 holds the remaining sorting fingers 178, 180, 182, and 184 against the spring bias exerted on these fingers.

When latch plate 232 is lifted, latch fingers 254, 252, 250, 248 and 246 successively shift above projection 256 and studs 188*d*, 188*c*, 188*b* and 188*a* with incremental upward movements of latch plate 232 since latch finger 254 is the shortest finger and fingers 252, 250, 248 and 246 are successively longer. This incremental upward displacement of latch plate 232 consecutively releases sorting fingers 176, 178, 180, 182 and 184 and allows springs 258 to consecutively swing fingers 176, 178, 180, 182 and 184 to their extreme clockwise unlatched positions starting with sorting finger 176.

Sorting finger 176 is released to its unlatched position, as shown in FIGURE 12, when latch plate 232 is vertically lifted sufficiently such that latch finger 254 just clears projection 256 and when latching arm 257 is free to be shifted under the bias of the spring 258 connected to sorting finger 176. When the foregoing conditions exist, spring 258 will swing sorting finger 176 to its unlatched position which is shown in FIGURE 12.

Following the release of sorting finger 176 and with continued reference to FIGURE 12, sorting finger 178 now is free to be swung a limited arcuate distance under the bias of its spring 258 until stud 188*d* moves into abutting engagement with edge 255 of latch finger 252. Sorting fingers 180, 182 and 184 follow finger 178 and are now held against further displacement by successive abutment with finger 178. This movement of sorting fingers 178, 180, 182 and 184 after finger 176 is released to its unlatched position is slight and the tips of fingers 178, 180, 182 and 184 remain substantially vertically below wall 198 of chute 126.

After sorting finger 176 is released, further upward displacement of latch plate 232 releases sorting fingers 178 as shown in FIGURE 13. After the release of sorting finger 178 to its unlatched position, finger 180 is then free to be swung, under the bias of its spring 258, through a limited arcuate distance until stud 188*c* moves into abutment with edge 255 of latch finger 250. Sorting fingers 182 and 184 follow finger 180 and are now held against further displacement by finger 180 in the manner shown in FIGURE 13. Again the movement of fingers 180, 182 and 184 is sufficiently slight such that the tips of fingers 180, 182 and 184 remain substantially vertically below wall 198 of chute 126.

A further upward incremental displacement of latch plate 232 which is sufficient to allow stud 188*c* to clear the bottom edge of latch finger 250 causes the release of sorting finger 180, enabling finger 180 to be swung to its extreme clockwise position (as viewed from FIGURE 13) under the bias of its spring 258. The release of sorting finger 180 frees sorting finger 182 to move in a clockwise direction under the bias of its spring 258 until stud 188*b* abuts edge 255 of latch finger 248 and hold finger 184 against displacement. Shifting latch plate 232 upwardly by an additional increment allows stud 188*b* to clear the bottom edge of latch finger 248 and sorting finger 182 is swung by its spring 258 to its unlatched position next to finger 180.

The release of finger 182 allows sorting finger 184 to be shifted slightly by its spring 258 until stud 188*a* comes into abutment with edge 255 of latch finger 246. The final incremental upward displacement of latch plate 232 permits stud 188*a* to clear the bottom edge of latch finger 246 thereby allowing sorting finger 184 to be swung into its extreme clockwise unlatched position under the bias of its spring 258. The extreme clockwise unlatched positions of each of the sorting fingers 176, 178, 180, 182 and 184 are limited by abutment of studs 188*a*, 188*b*, 188*c*, 188*d* and 188*e* with the right-hand edges of slots 190 as viewed from FIGURES 8, 12 and 13.

With the foregoing latch plate and sorting finger construction, it will be appreciated that latch plate 232 normally abuttingly holds the latched sorting finger furthest to the right, as viewed from FIGURES 8, 12 and 13. Each of the latched sorting fingers to the left of the latched sorting fingers abuttingly held by latch plate 232, is held in its latched position by abutment with the sorting finger at its right-hand side. By this construction, it is not necessary to arrange latch plate 232 on plate section 160 together with sorting fingers 176, 178, 180, 182 and 184 such that latch fingers 246, 248, 250, and 252 respectively and concomitantly engage studs **188*a*, 188*b*, 188*c* and 188*d*** since the latched sorting finger furthest to the right will prevent the release of the sorting fingers to its left.

Consequently, latch plate 232 and sorting fingers 176, 178, 180, 182 and 184 may be mounted on plate section 160 such that there is considerable play between these parts in latched position without interfering with the smooth and ready operation of the sorting mechanism. As a result of the wide variation of space that may permissibly exist between the latch fingers 246, 248, 250, and 252 and the associated studs **188*a*, 188*b*, 188*c* and 188*d*** in the latched position of the various sorting fingers, these parts may be readily manufactured by simplified mass production methods without appreciable regard to tolerances and clearances in making and assembling the parts.

In order to control the vertical displacement of latch plate 232 and thereby control the successive release of sorting fingers 176, 178, 180, 182 and 184 to provide a guideway to direct a coin of a given denomination into its proper change-maker magazine tube, the lower end of arm 137, as shown in FIGURES 10 and 14, is pivotally connected to the upper end of a rigid irregularly shaped link 280 as by a threaded post and nut assembly 282 (FIGURE 10). The lower end of link 280 is pivotally connected as by a post 283 (FIGURE 14), to a flat sided arm 284 formed rigid with a collar 286 (FIGURE 14) which is non-rotatably fixed as by a pin 288 to the left-hand end of a horizontally extending tubular shaft 290 as viewed from FIGURE 10. Shaft 290 extends through and is coaxially journalled in a sleeve 292 which is suitably fixedly mounted in a bore 294 formed in a hollow boss portion 295 of frame 34. As shown in FIGURE 14, arm 284 extends laterally away from shaft 290 at right angles to the rotational axis thereof and is pivotally connected at its free end to link 280.

Non-rotatably fixed as by a pin 296 to the right-hand end of shaft 290 extending beyond sleeve 292, as viewed from FIGURE 10, is a collar 298 which is provided with a flat sided arm 300 extending at right angles to the axis of shaft 290. Arm 300, as shown in FIGURE 11, is formed rigid with collar 298 and extends under and abuttingly engages a roller 302 which is rotatably secured to latch plate 232 and which extends horizontally and rearwardly thereof.

With the foregoing motion transmitting linkage, it is clear that when gauge arm 94 is pivotally displaced by a coin in one of the recesses 90, roller 138 is angularly displaced upwardly in a clockwise direction, as viewed from FIGURE 14, by a distance which is proportional to the diameter of the coin in the recess. This movement of roller 138 is linearly transmitted through arm 137 and link 280 to swing arm 284 and consequently rotate shaft 290 in a counterclockwise direction as viewed from FIGURE 14. Angular displacement of shaft 290, swings arm 300 about the axis of shaft 290 by a distance proportional to the diameter of the coin fed under the gauging roller 96. This displacement of arm 300 acts against roller 302 to displace latch plate 232 vertically upwardly by a distance proportional to the diameter of the coin fed under gauging roller 96. Latch plate 232 is displaced upwardly to consecutively release a predetermined number of the sorting fingers 176, 178, 180, 182 and 184 as hereinbefore explained to thereby form the proper guideway for directing the gauged coin into its associated change-maker chute below the sorting fingers.

With continued reference to FIGURE 11, latch plate 232 is shown to be biased downwardly by a vertically disposed coil spring 306 which has an upper end secured to a post 308 fixed to latch plate 232 and extending rearwardly therefrom. The lower end of spring 306 is secured to a horizontal post 310 which is fixed to the rearward side of finger plate section 160.

By this construction, it is clear that counterclockwise movement of arm 300, as viewed from FIGURE 11, acts against roller 302 to urge latch plate upwardly against the bias of spring 306. After the coin which is fed under gauging roller 96 to angularly displace arm 300 has been moved beyond roller 96 and toward transition surface 124 for entry into chute 126, gauging roller 96 is returned by spring 127, as hereinbefore described, to recess 120. This return movement of gauging roller 96, angularly shifts arm 300 in a clockwise direction, as viewed from FIGURE 11, through the motion transmitting linkage hereinbefore described such that arm 300 moves downwardly and away from roller 302. As a consequence, spring 306 reacts to urge latch plate 232 toward its lowermost latching position on finger plate section 160. If, however, latch plate 232 is raised by the initial counterclockwise displacement of arm 300 a sufficient distance to at least release sorting finger 176, such that its spring 258 swings finger 176 to its unlatched position an upwardly facing camming edge 312 on the tip of arm 257 is positioned vertically beneath latch finger 254. Due to the upward incline of slot 190 in which stud **188*e* is disposed, displacement of sorting finger 176 to its unlatched position arcuately raises the tip of latching arm 257 to thereby position camming edge 312 for holding latch plate 232 in an elevated position against the bias of spring 306**.

As shown in FIGURES 11 and 12, camming edge 312 extends forwardly with a downward slope from projection 256 to the outer tip of arm 257. Thus, when sorting finger 176 is in its extreme unlatched position to vertically position camming edge 312 below latch finger 254 and when arm 300 is swung away from roller 302, spring 306 urges latch plate 232 downwardly to bring the bottom edge of latch finger 254 into slidable abutment with camming edge 312, thereby preventing the return of latch plate 232 to its lowermost vertical position whenever one or more sorting fingers are in unlatched positions.

As shown in FIGURE 12, latch finger 254 rests on camming edge at the tip of arm 257 when sorting finger 176 is in its extreme clockwise unlatched position. By shifting arm 257 to the right, as viewed from FIGURE 11, it will be appreciated that latch finger 254 rides up on the sloping camming edge 312 to raise latch plate 232. Thus, when any of the sorting fingers 178, 180, 182 and 184 are unlatched, this upward camming movement of latch plate 232 allows studs **188*a*, 188*b*, 188*c* and 188*d* to slidably pass along the bottom edges of latch fingers 246, 248, 250 and 252 respectively. As a result, sorting finger 176 is able to push any of the unlatched sorting fingers 178, 180, 182 and 184 ahead of it by shifting latching arm 257** to the right as seen from FIGURE 11.

Thus, when the coin passes under and beyond gauging roller 96 thereby allowing arm 94 to return to the position shown in FIGURE 7, spring 306 biases latch plate 232 downwardly such that the bottom edge of latch finger 254 is urged toward a position where it abuttingly engages camming edge 312. When sorting fingers 184, 182, 180 and 178 are released to their unlatched positions, studs **188*a*, 188*b*, 188*c* and 188*d* will respectively be positioned beneath latching fingers 246, 248, 250 and 254. When latch plate 232 is cammed up by displacing arm 257 toward sorting finger 178, studs 188*d*, 188*c*, 188*b* and 188*a* are swung with sorting fingers 178, 180, 182 and 184 respectively into their spaces between latch fingers 246, 248, 250 and 252. As projection 256 passes beyond the bottom edge of latch finger 254 and into the space between latch fingers 252 and 254, latch plate 232 then is urged downwardly under the bias of spring 306 to its lowermost position where it latches sorting fingers 176, 178, 180, 182 and 184** in place preparatory to another sorting and distributing operation.

In swinging sorting fingers 176, 178, 180, 182 and 184 from unlatched to latched positions, it is clear that fingers 182 and 184 together with studs **188*b* and 188*a* respectively are swung slightly upwardly, whereas fingers 178 and 180 together with studs 188*d* and 188*c* respectively are swung somewhat downwardly due to the arrangement of slots 190. In cooperation with this swinging movement of sorting fingers 178, 180, 182 and 184, latching fingers 246 and 248 are formed with flat horizontal bottom edges, and latching fingers 250 and 252 are formed with bottom edges which are inclined downwardly in the direction of movement of studs 188*c* and 188*d* thereby enabling studs 188*a*, 188*b*, 188*c* and 188*d* to move freely along the bottom edges of latch fingers 246, 248, 250 and 252 as sorting fingers 178, 180, 182 and 184 are swung from their unlatched positions to their latched positions. With this construction, it is clear that sorting fingers 176, 178, 180, 182 and 184 cannot be locked up by latching plate 232** in their extreme clockwise unlatched positions.

The unlatched coin guiding positions of the sorting fingers are maintained in a manner as will be described until the coin which has been fed under gauging roller 96 to operate latch plate 232, has descended through chute 126 and through sorting finger compartment 174.

Figure 15:
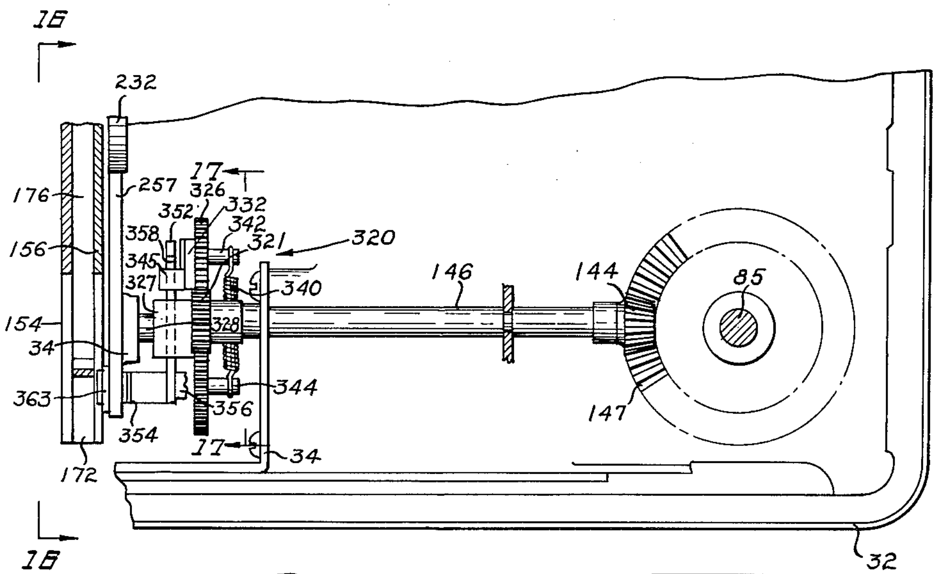
FIGURE 15 is a section taken substantially along lines 15—15 of FIGURE 5.

In order to re-set latch plate 232 and the released or unlatched sorting fingers such that all of the sorting fingers 176, 178, 180, 182 and 184 are returned to their extreme counterclockwise positions and latched in place by latch plate 232 preparatory to the feeding of another coin under gauging roller 96, a motor driven re-set mechanism 320 is provided for, and, as shown in FIGURES 5 and 15 comprises a gear 321 fixed as by a screw 322 to the front end of shaft 146 which extends horizontally toward the front face of the fare box upon which change-maker 152 is mounted.

Figures 16, 17:
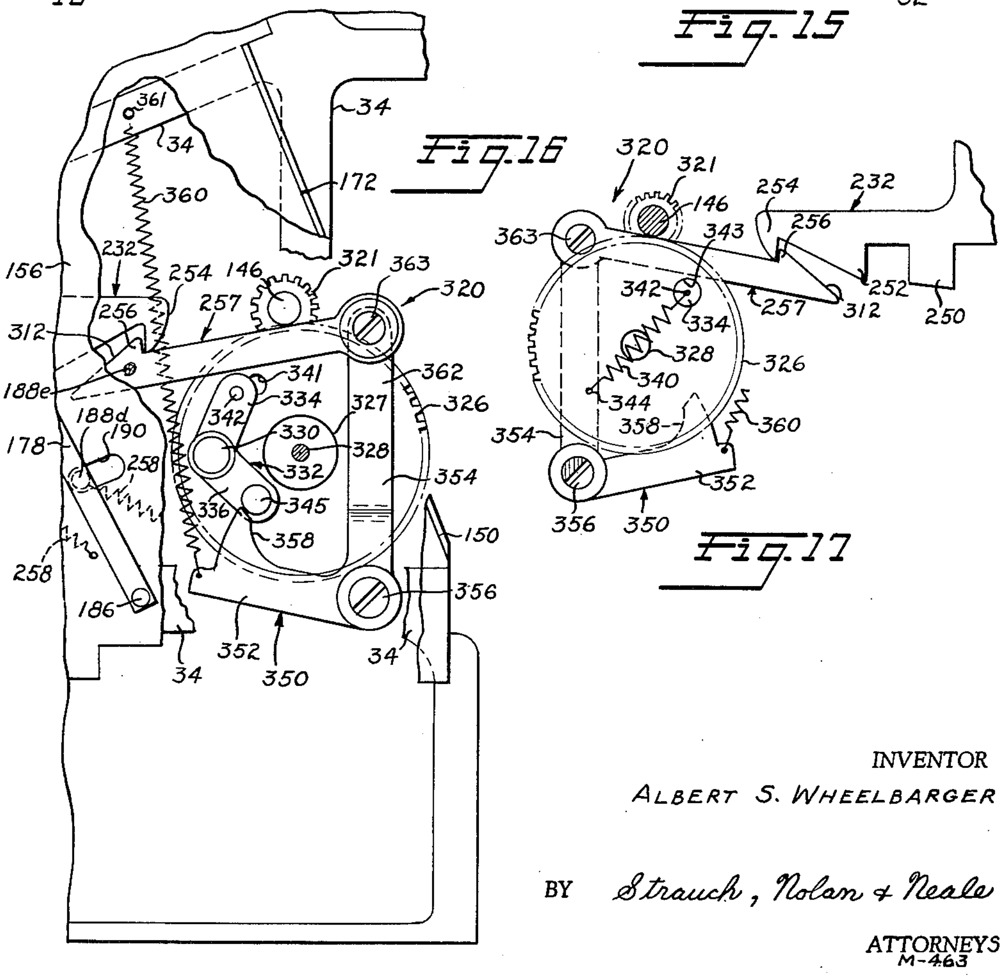
FIGURE 16 is a section taken substantially along lines 16—16 of FIGURE 15 with the sorting mechanism front cover plate removed and with the rear coin guide finger mounting plate partially broken away to show the details of the coin sorting reset mechanism in front elevation.
FIGURE 17 is a section taken substantially along lines 17—17 of FIGURE 15.

Referring now to FIGURES 5, 15 and 16, gear 321 is in constant meshing engagement with a gear 326 having a hub 327 suitably fixed to a stub shaft 328 (FIGURE 17) which is journalled near one end in frame 34. Gear 326 is formed with a flat front face and fixedly carries a post 330. Post 330 projects horizontally from the front face of gear 326 approximately midway between the rotational axis of the gear and the outer toothed periphery thereof. Pivotally mounted on post 330 is a rigid flat sided arm 332 which is bent in the general shape of an L in the manner shown to form a pair of intersecting legs 334 and 336.

As best shown in FIGURE 16, post 330 extends through arm 332 generally at the intersection of legs 334 and 336.

As best viewed in FIGURE 17, arm 332 is biased in a counterclockwise direction about pivot post 330, for a purpose as will become apparent, by means of a coil spring 340 which has one end secured to a horizontal post 342 extending through an aperture 343 in gear 326 and fixed to leg 334 near the free end thereof. The other end of spring 340 is secured to a horizontal post 344 which is fixed to gear 326 and extends rearwardly thereof.

With reference to FIGURES 5, 11, 15, 16 and 17, and as best shown in FIGURE 16, a roller 345 is mounted on the free end of leg 336 and extends horizontally forwardly from the front face of gear 326. As gear 326 is rotated, roller 345 is adapted to actuate a rigid one-piece flat sided finger return member 350 which is formed with generally mutually perpendicular arms 352 and 354. Member 350 is swingable in a vertical plane on a horizontal pivot post 356 (FIGURE 5) carried by frame 34 and extending through member 350 approximately at the intersection of arms 352 and 354. Arm 352 extends inwardly and to the rear of finger plate 156, and has an upwardly extending projection 358 near its free end. With this construction, as finger return member 350 is rocked about the axis of post 356 to displace arm 352 upwardly and in a clockwise direction, as viewed from FIGURE 16, projection 358 is moved into the path of roller 345 on gear 326.

Finger return member 350 is biased in a clockwise direction, as viewed from FIGURE 16, by means of a coil spring 360 which is secured at one end to the free end of arm 352 and at its opposite end to a post 361 carried by frame 34. Thus, projection 358 is constantly biased by spring 360 into the closed circular path of roller 345.

With reference to FIGURES 11 and 16, arm 354 of finger return member 350 extends upwardly and has a vertical offset portion 362 which extends closely adjacent to the rear face of latch plate 232. The upper free end of offset portion 362 is pivotally connected, as by a post 363, to arm 257 which extends through a slot 364 (FIGURE 5) formed in frame 34. With this construction, it is clear that the biasing force exerted by spring 360 is opposed by sorting finger 176 when in its latched position to retain projection 358 below roller 345. When sorting finger 176 is angularly displaced to its unlatched extreme clockwise position, as viewed from FIGURES 8 and 16, arm 257 is also displaced to the right through the rigid connection provided by stud **188*e*. This displacement of arm 257 tends to swing finger return member 350 in a clockwise direction, as viewed from FIGURE 16, about post 356 and allows spring 360 to lift projection 358 into the path of roller 345**.

When projection 358 is positioned in the path of roller 345, it will be appreciated that one or more of the sorting fingers 176, 178, 180, 182 and 184 are required to be unlatched and in their extreme clockwise positions. Thus, when motor 82 is energized and clutch 86 is engaged to drivingly connect shaft 83 to shaft 85, gear 326 is rotated in a clockwise direction, as viewed from FIGURE 16. Roller 345, rotating with gear 326, moves into abutment with projection 358 disposed on the path thereof to urge projection 358 downwardly against the bias of spring 360 and consequently swing finger return member 350 in a counterclockwise direction. This counterclockwise displacement of finger return member 350 shifts arm 257 to the left, as viewed from FIGURE 16, to return sorting finger 176 to its extreme counterclockwise latched position.

When sorting finger 176 is swung about the axis of its pivot 186 to its extreme counterclockwise latched position, it abuts and pushes finger 178 ahead of it if the latter finger has been unlatched. With the arrangement of sorting fingers as hereinbefore described, it will be appreciated that starting with sorting finger 176, each of the sorting fingers 176, 178, 180 and 182 will abuttingly move the unlatched sorting finger to the left of it back to its initial extreme counterclockwise latched position.

When all of the unlatched sorting fingers are returned to their extreme counterclockwise latched positions, latch plate 232 is no longer held in elevated position by latching arm 257 and is thereby allowed to return to its lowermost latching position under the bias of spring 306.

In operation of re-set mechanism 320, for each revolution of shaft 85, shaft 328 and gear 326 are also rotated through one complete revolution and, consequently, complete four revolutions for each revolution of pick-up plate 76. Thus, for each of the four recesses 90 in pick-up plate 76, a predetermined number of sorting fingers 176, 178, 180, 182 and 184 are consecutively unlatched to form a guideway for directing the coin in the recess into its proper magazine change-maker tube and then are re-set and latched in place preparatory to the gauging of a subsequent coin following in order. Consequently, sorting fingers 176, 178, 180, 182 and 184 are set to coin guiding positions and re-set as many times as there are coin receiving recesses 90 in pick-up plate 76. For each cycle of pick-up plate 76, therefore, the sorting fingers will alternately set and re-set four times providing that there are coins in each of the recesses 90 of greater denomination than a small token.

Spring 340 prevents damage to the sorting mechanism if for any reason, any of the sorting fingers 176, 178, 180

182 or 184 become jammed or locked in their unlatched positions, or finger return member 350 or arm 257 becomes jammed or locked in place with projection 358 positioned in the path of roller 345. When such foregoing or similar conditions occur which would prevent an unbinding return of sorting fingers 176, 178, 180, 182 and 184 to their latched positions by re-set mechanism 320, the bias exerted by spring 340 is overcome when roller 345 is unable to depress projection 358 thereby allowing roller 345 to ride up over projection 358. As a result, damage to the sorting mechanism 150 is prevented.

In operation of the fare box apparatus thus far described, the various mechanisms in the fare box are actuated when a cluster of coins descend through chute 62 and into hopper 66 where they are picked up one at a time by pick-up plate 76 and fed under gauging roller 96 as hereinbefore described. Before the coin is fed under gauging roller 96, the components of sorting mechanism 150 are positioned in the manner shown in FIGURES 1, 5, 8, 10, 11, 14 and 15–17, with sorting fingers 176, 178, 180, 182 and 184 in their latched positions such that the tips thereof are disposed vertically beneath wall 198 of chute 126.

Assume that a penny is initially carried under gauging roller 96 to actuate sorting mechanism 150. As roller 96 is angularly displaced about pivot 95 by the penny in recess 90, roller 138 is lifted to swing arm 137 upwardly in a clockwise direction about the axis of shaft 134 as viewed from FIGURE 14.

This upward pivotal displacement of arm 137 lifts link 280 to swing arm 284 in a counterclockwise direction about the axis of shaft 290 as still viewed from FIGURE 14. Sleeve 292 (FIGURE 10) being rigid with arm 284 rotates about the axis of shaft 290 in a corresponding direction to swing arm 300 (FIGURE 11) upwardly in the same rotational direction.

As arm 300 is swung upwardly about the axis of shaft 290 as viewed from FIGURE 11, it bears against roller 302 which is fixed to latch plate 232 to vertically lift latch plate 232 by a magnitude which is proportional to the diameter of the penny. This upward vertical displacement of latch plate 232 is guided by rollers 240 and 242 (FIGURE 11) and moves latching fingers 252 and 254 slightly above stud 188*d* and projection 256 so as to consecutively release sorting fingers 176 and 178 and to allow fingers 176 and 178 to swing about pivots 186 under the bias of their springs 258 to their extreme unlatched clockwise positions shown in FIGURE 13.

With latch plate 232 in this partly raised position, it will be appreciated that sorting fingers 180, 182 and 184 remain in their extreme counterclockwise latched positions with stud 188*c* in engagement with the seating side edge 255 of latching finger 250. Thus, sorting fingers 176, 178, 180, 182 and 184 assume the positions shown in FIGURE 13 to form a guideway for the penny between sorting fingers 178 and 180.

As the penny in pick-up plate recess 90 is rotated beyond gauging roller 96 and toward chute 126, roller 96 is returned to recess 120 (FIGURE 7) by the bias of spring 127 which acts to urge arm 137 downwardly (FIGURE 14). By swinging arm 137 downwardly under the bias of spring 127, link 280 is shifted downwardly to swing arm 300 downwardly through the motion of arm 284 and sleeve 292 (FIGURE 10) and out of contact with roller 302. Since latch plate 232 is no longer supported by arm 300 bearing against the underside of roller 302, spring 306 (FIGURE 11) tends to urge latch plate 232 vertically downwardly. However, downward displacement of latch plate 232 is now prevented by camming edge 312 and stud 188*d* which are in raised position as shown in FIGURE 13 and which bear against the bottom edge of latching fingers 252 and 254 and hereinbefore explained.

Spring 306 in urging latch plate 232 downwardly such that the bottom edges of latch fingers 254 and 252 are positioned to bear against camming edge 312 and stud 188*d*, prevents accidental upward displacement of latch plate 232 if the fare box is jarred and thereby prevents the release of latched sorting fingers 178, 180 and 182.

Thus, it is clear that although gauging roller 96 is returned in its plate recess 120 for actuation by another coin, sorting fingers 176, 178, 180, 182 and 184 remain in the positions shown in FIGURE 13 for guiding the penny which is, at this point, just entering chute 126.

While the next coin in the second of the pick-up plate recesses 90 is approaching gauging roller 96, the space between adjacent recesses 90 and the rotational speed of pick-up plate 76 is such that sufficient time is allowed for the penny to descend through chute 126 and to be guided by sorting fingers 178 and 180 into change-maker chute 210 (FIGURE 8), which directs the penny into magazine tube 212 to thereby complete the sorting and distributing operation.

With the movement of sorting finger 176 to its unlatched position, displacement of arm 257 to the right, as viewed in FIGURE 16, causes finger return member 350 to swing about the axis of post 356 in a clockwise direction to raise projection 358 upwardly into the circular path of roller 345 carried by gear 326.

At the same time that the foregoing sorting cycle is taking place to direct the penny into change-maker tube 212, re-set mechanism 320 is actuated by motor 82 which is energized, as hereinbefore explained by the coins in hopper 66. Energization of motor 82 drives gear 147 to rotate shaft 146 and gear 321 which, in turn, rotates gear 326 in a counterclockwise direction as viewed from FIGURE 17.

Since shaft 85 is drivingly connected to gear 326 and to pick-up plate 76 and always begins its rotation from the same "home" position, gear 326 and pick-up plate 76 begin and cease rotation at the same time. As hereinbefore described, shaft 85 and gear 326 rotate through four complete revolutions for each revolution of pick-up plate 76. Thus, gear 326 completes one revolution each time one of the four recesses 90 passes under gauging roller 96. Roller 345 is positioned on gear 326 such that it passes the place where projection 358 intersects its circular path at the same time that each recess 90 has passed beyond roller 96 by a common predetermined angular distance. Consequently, it will be appreciated that latching arm 257 is intermittently actuated in timed relationship with the movement of recesses 90 relative to gauging roller 96. This timed relationship is such that before the next coin following the penny is fed under gauging roller 96, sufficient time has elapsed to allow the penny to descend through sorting finger compartment 174 and into chute 210. As the penny leaves compartment 174 and before the next recess 90 containing a coin following the penny reaches gauging roller 96, roller 345 (FIGURE 16) depresses projection 358 to swing finger return member 350 for shifting arm 257 to the left as viewed from FIGURE 13. Consequently, before the next coin is fed under gauging roller 96, sorting finger 176 is swung in a counter clockwise direction about the axis of post 186 and pushes sorting finger 178 ahead of it to the latched positions of sorting fingers shown in FIGURE 8.

Spring 306 (FIGURE 11) now acts to pull latch plate downwardly to its lowermost latching position where all of the sorting fingers 176, 178, 180, 182 and 184 are latched and held in place with their tips vertically below wall 198 of chute 126 as shown in FIGURES 8 and 11 and as hereinbefore described. Thus, sorting fingers 176, 178, 180, 182 and 184 are all latched in place preparatory to the passage of the next coin under gauging roller 96.

As the next coin in the recess 90 following the passage of the penny is fed under gauging roller 96 the foregoing sorting, distributing and re-set cycles are repeated. These sorting and re-set cycles are repeated until all the coins are removed from hopper 66 and deposited in their proper tubes of change-maker 152 at which time motor 82 is de-energized.

With the present embodiment, the small token has the smallest diameter of the coins and tokens which are gauged, registered and sorted. When a small token is fed under gauging roller 96, arm 94 is pivoted slightly about pivot 95 to vertically shift rod 129 to a position where lever 141 is operable to actuate the proper counter 98, of registering mechanism 104 as described in the aforementioned Patent 2,943,631.

Pivotal displacement of gauging arm 94, as hereinbefore explained, causes an upward vertical displacement of latch plate 232. The magnitude of displacement of latch plate 232 which is caused by feeding a small token under gauging roller 96, however, is not enough to lift latch plate 232 a sufficient distance to allow projection 256 of latching arm 257 to clear the bottom edge of latch finger 254. As a consequence, sorting finger 176 is not released by latch plate 232 and remains in its latched position as shown in FIGURE 8. Thus, a guideway through sorting compartment 174 for the small token is formed between sorting finger 176 and lip 172 on finger plate 156. This guideway directs the small token into chute 202 which is connected to magazine tube 204.

From the foregoing, it will be appreciated that gauging arm 94 actuates both the sorting mechanism 150 and the registering mechanism 104 simultaneously to facilitate the registration and sorting operations.

In the present embodiment, sorting mechanism 150 is operative to sort six different denomination of coins and tokens, ranging from a small token, which has a diameter less than a dime, to a quarter which has a diameter greater than a large token. It will be appreciated however, that this range may be increased or decreased essentially by respectively increasing or decreasing the number of sorting fingers and latching fingers.

Figures 18, 19:
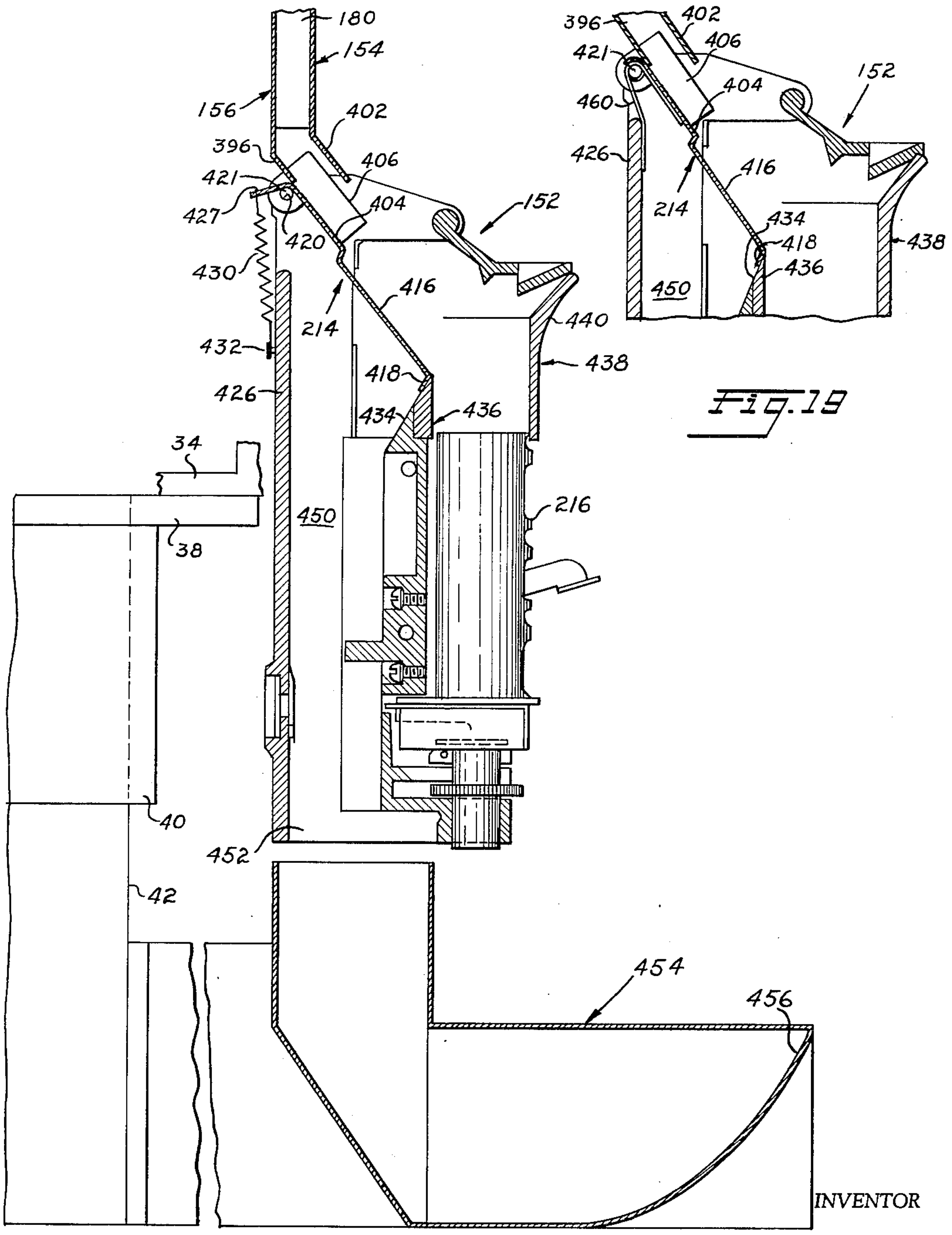
FIGURE 18 is a section substantially along lines 18—18 of FIGURE 8 and showing the construction of the guide chutes for the multi-barrel change-maker.
FIGURE 19 is a section similar to FIGURE 18 but showing another embodiment of the coin guide chutes for the multi-barrel change-maker.

With reference now to FIGURES 8, 11, and 18, finger plate 156 is provided with a set of parallel spaced apart tabs 390, 392, 394, 396, 398 and 400 which are extending from the bottom edge of plate 156 below sorting fingers 176, 178, 180, 182 and 184 and which are bent forwardly from plate section 160 in a common inclined plane. Tabs 390, 392, 394, 396, 398 and 400 respectively align with chutes 202, 206, 210, 214, 218 and 222 and the various sorting mechanism coin guideways formed by lip 172, sorting fingers 176, 178, 180, 182 and 184, and lip 170 as hereinbefore described. Front cover plate 154 is provided with an inclined plate portion 402 (FIGURE 10) below the sorting fingers which is bent forwardly out of a vertical plane and in parallel spaced apart relationship to tabs 390, 392, 394, 396, 398 and 400 such that the coins passing through the sorting fingers compartment 174 are guided at an incline by the tabs and portion 402 into the various chutes 202, 206, 210, 214, 218 and 222 depending upon the denomination of the coin.

With continued reference to FIGURES 8 and 18, chutes 202, 206, 210, 214, 218 and 222 are of special and novel construction to prevent coins from piling up in any one of the chutes 202, 206, 210, 214, 218, or 222 when any one of the respective change-maker tubes 204, 208, 212, 216, 220 and 224 become filled such that the coins overflow from the tubes. Since each of the chutes 202, 206, 210, 214, 218 and 222 are identically constructed, only one chute will be described in detail with like reference numerals designating identical parts.

Thus, each chute 202, 206, 208, 214, 218 and 222, as shown in FIGURES 8 and 18, is of one-piece construction and is formed with a downwardly inclined flat platform 404 which has its sides bent upwardly on each side to form two vertical parallel spaced apart dividing walls 406 and 408.

Below walls 406 and 408, platform 404 is provided with a downwardly inclined offset section 416 which terminates at its lower end in a lip 418 bent downwardly at approximately right angles to offset section 416 as best shown in FIGURE 18. Dividing walls 406 and 408 of each of the chutes 202, 206, 210, 214, 218 and 222 are formed with coaxial apertures, indicated at 420 (FIGURE 18) which rotatably receive a horizontal rod 421.

With continued reference to FIGURES 8 and 18, rod 421 is fixed in coaxial bores formed in opposed parallel side walls 422 and 424 of changer-maker 152 and extends horizontally beneath tabs 390, 392, 394, 396, 398 and 400 from one side of finger plate 156 to the other and above a vertical rear wall 426 (FIGURE 18) of change-maker 152. Between the adjacently disposed dividing walls 406 and 408 of chutes 202, 206, 210, 214, 218 and 222, annular spacers 428 (FIGURE 8) of equal axial lengths are mounted on rod 421 to retain chutes 202, 206, 210, 214, 218 and 222 axially in place on rod 421 but to permit chutes 202, 206, 210, 214, 218 and 222 to be freely rotatable about the axis of rod 421.

With continued reference to FIGURES 8 and 18, the upper edge of each platform 404 is notched away adjacent to dividing walls 406 and 408 to form an upwardly inclined extension piece 427 for each of the chutes 202, 206, 210, 214, 218 and 222. Extensions 427 of chutes 202, 206, 210, 214, 218 and 222 are bent over rod 421 with their top surfaces immediately beneath tabs 390, 392, 394, 396, 398 and 400 respectively. With this construction, chutes 202, 206, 210, 214, 218 and 222 are permitted to swing downward from the positions shown.

As best shown in FIGURE 18, each extension 427 extends rearwardly beyond rod 421 at a slight downward incline and engages one end of an upstanding coil spring 430. The lower end of each coil spring 430 is secured to a post 432 fixed to wall 426 to biasingly urge each of the chutes 202, 206, 210, 214, 218 and 222 upwardly in a counterclockwise direction about the axis of rod 421, as viewed from FIGURE 18, such that platforms 404 of chutes 202, 206, 210, 214, 218 and 222 bear against and are essentially parallel with tabs 390, 392, 394, 396, 398 and 400 in the manner shown. With this construction, it will be appreciated that each of the chutes 202, 206, 210, 214, 218 and 222 are independently biasingly mounted on rod 421.

With platforms 404 bearing against and extending generally parallel to tabs 390, 392, 394, 396, 398 and 400 the platform lips 418 slidably abut the upper edge of an inclined surface 434 of a wall 436 which forms a part of a partitioned coin depositing receiver 438 disposed above the barrels of change-maker 152. In the positions of chutes 202, 206, 210, 214, 218 and 222 shown in FIGURES 8 and 18, lips 418 are substantially parallel with surface 434 and adjacent to the top edge of wall 436 so that coins descending through chutes 202, 206, 210, 214, 218 and 222 freely slide into receiver 438. When chutes 202, 206, 210, 214, 218 and 222 are rotated downwardly in a clockwise direction as viewed from FIGURE 18, lips 418 are swung down and away from surface 434. As a result of the slidable abutment of lips 418 with wall surface 434 and the abutment of platforms 404 with tabs 390, 392, 394, 396, 398 and 400, chutes 202, 206, 210, 214, 218 and 222 are prevented from further upward swinging displacement beyond the positions shown in FIGURES 8 and 18.

Receiver 438 is essentially formed by wall 436, side walls 422 and 424, and an upright front wall 440 extending parallel to wall 436 and perpendicular to side walls 412 and 424. Between each of the adjacently disposed coin receiving tubes 204, 208, 212, 216, 220 and 224 of change-maker 152, a partition 446 (FIGURE 8) is provided for and extends perpendicularly between walls 436 and 440 to thereby form separate guideways connecting chutes 202, 206, 210, 214, 218, and 222 to the open tops of magazine tubes 204, 208, 212, 216, 220 and 224 respectively.

With the exception of the foregoing chute constructions 202, 206, 210, 214, 218 and 222, coin depositing receiver 438 may be constructed essentially the same as that disclosed in U.S. Letters Patent No. 2,685,406 issued August 3, 1954 to E. W. Haas to which reference is made in the event a more detailed description is required.

The remaining components of change-maker 152 are of conventional construction and are similar to that disclosed in U.S. Letters Patent 2,338,576 issued January 4, 1944 to F. F. Daugherty and is not further described herein, except that in this instance, there are six coin receiving tubes 204, 208, 212, 216, 220 and 224 instead of the four tubes shown in Patent No. 2,338,576.

With continuing reference to FIGURES 8 and 18, when one or more of change-maker tubes 204, 208, 212, 216, 220 and 224 become filled and additional coins are delivered thereto, the additional coins accumulate in receiver 438 and back up on platforms 404 of chutes 202, 206, 210, 214, 218 and 222. The biasing force exerted by each of the springs 430 to retain chutes 202, 206, 210, 214, 218 and 222 in the positions shown in FIGURES 8 and 18 is such to support the weight of only a predetermined number of coins. The number of coins that can be supported by the bias of springs 430 is normally maintained at two so that springs 430 will not support an accumulation of coins which will back up into the sorting mechanism compartment 174 and into the guideways formed by sorting fingers 176, 178, 180, 182 and 184 where they would interfere with the movement of fingers 176, 178, 180, 182 and 184.

When two or more coins or tokens collect on any one of the chutes 202, 206, 210, 214, 218 and 222 in the present embodiment chutes 202, 206, 210, 214, 218 and 22 are individually swung downwardly independently of each other against the biasing force exerted by springs 430 to allow the coins to slide off the chutes and into a common vertical passage 450 below chutes 202, 206, 210, 214, 218 and 22.

Passage 450 is generally rectangular in cross section and extends from one side of change-maker 152 to the other, rearwardly of change-maker tubes 204, 208, 212, 216, 220 and 224. As best shown in FIGURE 18, passage 450 is formed by wall 436 at its front side and by end wall 426 which is substantially in parallel spaced apart relationship to wall 436. The sides of passage 450 are suitably closed by walls 422 and 424 and passage 450 has a bottom opening 452 through which the overflow coins fall.

An overflow cup 454 of any suitable conventional type is fixed to pedestal 42, as by a screw 455 (FIGURE 2) in a position to receive the coins falling through the bottom opening 452 of passage 450 and to direct them to a tray portion 456 at the front of the fare box where they are accessible to the operator.

Thus, it will be appreciated that the sloping spring biased chutes 202, 206, 210, 214, 218 and 222 are operable independently of each other to discharge an accumulation of overflow coins collected on the chutes into overflow cup 454 through passage 450. As a consequence, when conditions occur that one or more of the change-maker tubes 204, 208, 212, 216, 220 and 224 become filled and additional deposit of coins overflows the tubes, the foregoing novel biased trap-like chute construction automatically disposes of the excess coins and prevents the sorting mechanism 150 from becoming jammed as a result of an oversight by the operator to unload the change-maker.

In the embodiment illustrated in FIGURE 19, the coil springs 430 are replaced by flat hair springs 460. Each of the springs 460 are wound around rod 421 and has one extending downwardly and reacting against wall 426. The other ends of springs 460 individually bear against the underside of chutes 202, 206, 210, 214, 218, and 222 to thereby independently urge each of the chutes 202, 206, 210, 214, 218 and 222 into the positions shown such that platforms 404 of each chute bears against tabs 390, 392, 394, 396, 398 and 400 to allow coins sliding down the chute to enter receiver 438 and be deposited in their proper change-maker tube as hereinbefore described. The operation of chutes 202, 206, 210, 214, 218 and 222 with springs 460 is the same as that described in connection with the spring embodiment illustrated in FIGURE 18.

With the foregoing coin sorting and distributing apparatus, it will be appreciated that the likelihood of coins jamming the apparatus is substantially eliminated. The singling and feeding mechanism 64 assures that the coin pieces are intermittently delivered one at a time to gauging roller 96 and then to chute 126. The timed relationship between the unlatching of sorting fingers 176, 178, 180, 182 and 184, the operation of re-set mechanism 320 and singling and feeding mechanism 64 assures the complete sorting and distribution of each coin piece before any following coins are gauged and sorted. Consequently, with the apparatus according to the present invention, no more than one coin piece is allowed to be in coin sorting compartment 174 at one time and each coin piece is required to clear sorting mechanism 150 before the next coin is gauged.

Also with the present invention, there is practically no likelihood of component parts of sorting mechanism becoming hung or jammed up. The sorting fingers 176, 178, 180, 182 and 184 are freely swingable about the axes of their respective pivots 186 and only slidably engage vertical edges 255 of latch plate 232 in their latched position. If displacement of gauging arm 94 by a coin piece fails to lift latch plate 232, the coin piece will be guided through compartment 174 between lip 172 and sorting finger 176. Coin pieces larger than a small token not being able to be deposited in magazine tube 204 because of their larger diameters, will accumulate on chute 202 and when two or more of such coin pieces collect on chute 202, the bias of spring 430 will be overcome to divert the coin pieces into the overflow tray 454.

After any of the sorting fingers 176, 178, 180, 182 and 184 are swung under the bias of springs 258 to their unlatched positions, it is clear that latch plate 232 cannot restrain the sorting fingers against return to their latched positions due to the limited arc through which sorting fingers 176, 178, 180, 182, and 184 can be swung relative to the width and configuration of latch fingers 246, 248, 250, 252, and 254. Also, after each coin piece passes beyond gauging roller 96, the mechanical motion transmitting linkage imparting upward displacement to latch plate 232 is dis-established thereby allowing latch plate 232 to ride free of gauging arm 94. Moreover, regardless of the position of latch plate 232 and the position of gauging arm 94, latch plate 232 is free to be displaced upwardly by the camming action of latching arm 257 as arm 257 is shifted toward the latched position of sorting fingers 176, 178, 180, 182 and 184. Thus, if for some reason, gauging arm 94 is not returned to a position where gauging roller 96 enters 120, latch plate 232 still will be lifted by the cyclic operation of re-set mechanism 320 to return any unlatched sorting fingers to their latched position.

When gauging arm 94 is returned, under normal conditions, to a position where gauging roller 96 enters recess 120 and latching arm 257 is shifted to the left (as viewed from FIGURE 8) during the re-setting of the sorting fingers, finger 176 pushes the other unlatched sorting fingers ahead of it only against the bias of springs 258.

Thus, it will be appreciated that the foregoing apparatus provides for reliable and accurate singling, gauging, registering, sorting and distributing operations to be automatically performed over long periods of time. Sorting mechanism 150 is constructed according to the present invention to appreciably reduce the possibilities of jamming and malfunction in comparison to other previously known sorting mechanisms and is readily adapted to fare box structures because of its compactness, its simplicity in construction and its accurate reliability in operation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. A coin sorting apparatus for separating and distributing coin pieces according to their denominations comprising: means providing a compartment having a coin inlet and a coin outlet; a row of coin guide members disposed in said compartment between said inlet and said outlet, means pivotally mounting said coin guide members independently of each other about substantially parallel spaced apart axes for movement in a substantially common plane from one position to another position spaced apart from said one position, said coin guide members being so arranged in said one position that they abut adjacently disposed ones of said coin guide members adjacent said inlet, and means responsive to different coin denominational sizes introduced into said apparatus for automatically shifting a different predetermined number of said guide members in succession from said one position to said other position to form a different guideway through said compartment for each denomination of coin piece to be sorted.

2. A coin sorting apparatus for separating and distributing coin pieces according to their denominations comprising: a row of coin guide members pivotally mounted independently of each other for swinging movement in a substantially common plane from one position to another position angularly spaced apart from said one position, and means responsive to different coin denominational sizes introduced into said apparatus for automatically swinging a different predetermined number of said guide members in succession from said one position to said other position to form a different guideway for each denomination of coin piece to be sorted.

3. The coin sorting apparatus as defined in claim 2 wherein said means comprises an actuating means operably engaging said guide members to latch said guide members in said one position, said actuating means being displaceable to disengage from said guide members only consecutively, and means individual to each of said guide members for swinging said guide members to the other of said positions upon disengagement of said actuating member from said guide members.

4. The coin sorting apparatus defined in claim 3, wherein said actuating means comprises a unitary member, and means for mounting said unitary member only for limited reciprocal displacement, said guide members being intermittently released one after the other with sequential increments of movement of said unitary member in a single predetermined direction.

5. The coin sorting apparatus as defined in claim 4 wherein said incremental movements of said unitary member are arranged to be proportional to the diameters of the different coin pieces within said range and are of successively increasing magnitudes.

6. The coin sorting appartus as defined in claim 3 wherein said means for swinging said guide members to the other of said positions comprises a plurality of spring members connected one to each of said guide members for continuously biasing said guide members toward said other position.

7. The coin sorting apparatus defined in claim 6 comprising power means operably connected to said guide members for automatically cyclically restoring those guide members in said other position to said one position following the distribution of each coin piece and against the bias exerted by said spring members.

8. The sorting apparatus defined in claim 7, a power train connecting said power means only to the end-most of said guide members disengaged first by said unitary member, each of said guide members being arranged to abut with adjacently disposed guide members so that swinging movement of one guide member against spring bias pivotally displaces the other guide members ahead of it, whereby return of said end-most guide member toward said one position urges other released guide members ahead of it toward said one position.

9. The sorting apparatus defined in claim 8 comprising means for automatically disconnecting said power train from said end-most guide member whenever one of said guide members is forcibly restrained against movement toward said one position.

10. In a coin sorting and gauging apparatus for separating and distributing coin pieces according to their denominations, a row of elongated coin guides pivotally mounted independently of each other about spaced apart axis for separate consecutive swing movement between angularly spaced apart positions, a latching member separably engaging said coin guides for latching said coin guides in one of said positions and being displaceable for disengaging from said coin guides consecutively, means for swinging said coin guides to said other position upon disengagement of said latching member from said coin guides, and coin gauging means responsive to the denomination of each coin piece to be sorted and operably connected to automatically displace said latching member to cause said latching member to disengage from a different predetermined number of said coin guides for each different denomination of the coin being gauged to allow the disengaged coin guides to be swung to said other position and thereby form a different guideway for each denomination of coin piece to be sorted within a predetermined range of denominations.

11. In a coin handling apparatus having a coin gauging mechanism including a member shiftable in proportion to the diameter of the coin piece being gauged and a registering mechanism controlled by said gauging mechanism, a coin sorting apparatus for automatically separating and distributing gauged and registered coin pieces according to their different denominations to a row of separate upstanding collection chambers, said coin sorting apparatus comprising: means forming a coin sorting compartment having opposed spaced apart upstanding wall portions, a top inlet arranged to receive gauged coin pieces from said gauging mechanism and to deliver the gauged coin pieces one at a time into said compartment, a bottom outlet in communication with said collection chambers and being otherwise closed; a row of elongated coin guide elements for guiding coin pieces through said compartment and being pivotally mounted independently of each other between said wall portions for swinging movement about successively spaced apart parallel axes, said coin guide elements being disposed longitudinally between said inlet and said outlet and being arranged such that they are separately swingable only in succession through limited arcuate distances between two angularly spaced apart positions, the upper tips of said guide elements being disposed at one side of said inlet in one of said positions and being disposed at the other side of said inlet when said guide elements are in the other of said positions; a latching member operably engaging said coin guide elements for latching said coin guide elements in said one position and being upwardly displaceable for consecutively disengaging from said coin guide elements one at a time with each successive increment of upward displacement thereof; spring means individual to each of said coin guide elements and continuously biasing said guide elements to the other of said positions to swing the ones of said guide elements disengaged from said latching member to the other of said positions; means connecting said gauging mechanism member to said latching member to displace said latching member upwardly in proportion to the diameter of the coin piece being gauged such that a different predetermined number of guide elements are consecutively disengaged from said actuating member and swung by said spring means to said other position for each denomination of coin piece to be sorted thereby forming a different guideway through said compartment for each denomination of coin to be sorted within a predetermined range of denominations.

12. In the coin handling apparatus defined in claim 11, a row of coin guide chutes one for each of said collection chambers arranged between said collection chambers and said sorting compartment outlet immediately below said coin guide elements such that coin pieces overflowing said collection chambers collect and rest on said chutes, an overflow tray below chutes, and passage means extending from below said chutes to said overflow tray, said chutes being individually spring biased to a position for guiding coin pieces from said outlet into said collection chambers and being swingable against the biasing force exerted thereon to divert the coin pieces away from said collection chambers and into said passage means, the spring biasing force exerted on said chute and being such to be overcome by the weight of a predetermined number of coin pieces resting thereon such that when said collection chambers become filled with coin pieces and additional coin pieces overflow said collection chambers to collect on said chutes, the additional coin pieces overcome the biasing force on said chutes to be discharged through said passage means to said overflow tray.

13. The coin handling apparatus as defined in claim 12, wherein said chutes are pivotally mounted on a common rod.

14. The coin handling apparatus as defined in claim 11, including motor drive means for cyclically returning said coin guide elements to said one position after each gauged coin piece has been properly guided through said compartment for deposit in the collection chamber corresponding to its denomination.

15. The coin handling apparatus as defined in claim 14, wherein a power train connects said motor drive means only to the end-most of said coin guide elements in said row which is nearest to said other position, said end-most coin guide element being arranged to urge the other of said coin guide elements ahead of it to said one position.

16. The coin handling apparatus as defined in claim 15, a singling mechanism for feeding coin pieces one at a time to said gauging mechanism, said motor drive means being connected to power said singling mechanism and being automatically energized by deposit of coin pieces in said singling mechanism.

17. In a coin handling device, an automatic coin gauging mechanism, a coin feed mechanism for automatically feeding coins one at a time to said gauging mechanism and a coin sorting and distributing mechanism having a plurality of coin guide elements mounted separately of each other and being individually movable between spaced apart positions to form a different guideway for each denomination of coin to be sorted, means under the control of said gauging mechanism to displace predetermined numbers of said coin guide elements to one of said positions in response to the denomination of the coin being gauged to thereby separate and distribute gauged coins in accordance with their different denominations, a motor and means operably connecting said motor to said feed mechanism and said coin sorting and distributing mechanism to power said coin sorting and distributing mechanism and said feed mechanism in timed relationship with each other, said motor being operable to return said coin guide elements in said one position to the other of said positions.

18. In a fare box, a change receiver having a row of coin collection chambers one for each denomination of coin within a predetermined range, a coin sorting and distributing mechanism arranged above said coin receiver for separating and distributing coins to said collection chambers in accordance with their different denominations, separate coin guide chutes, means mounting said chutes for swinging movement about a common axis, one for each of said collection chambers, said chutes extending between said mechanism and said collection chambers for guiding sorted coins into said collection chambers and being arranged at an incline such that coins which overflow said collection chambers accumulate on respective ones of said chutes, and means comprising spring members separately associated with each of said chutes to permit the weight of a predetermined number of coins thereon to displace said chutes for diverting coins thereon away from the collection chambers associated therewith, thereby preventing coins from accumulating in such a number that they back up into said sorting and distributing mechanism said spring members engaging said chutes for separately biasing said chutes to a position where said chutes guide coins into their associated collection chambers, the biasing force exerted by said spring members being such to be overcome by the weight of a predetermined number of coins in respective ones of said chutes, said chutes being operable when the biasing force of the associated spring member is overcome to swing away from the positions where they guide coins into said collection chamber.

19. The fare box as defined in claim 18 wherein said spring members bias said chutes upwardly, and passage means are disposed below said chutes for conveying away accumulations of coins on said chutes which overcome the bias of said springs.

20. In a fare box, a change receiver having a row of upstanding coin-collection magazine tubes one for each denomination of coin within a predetermined range, a coin sorting and distributing mechanism having an outlet arranged above said change receiver, a plurality of downwardly sloping coin guide chutes associated one with each of said magazine tubes and extending from said outlet to positions above said magazine tubes for guiding sorted coins from said outlet into said magazine tubes, said sorting and distributing mechanism having automatically controlled coin guide elements disposed adjacent to said outlet and being displaceable to direct coins according to their denominations onto different ones of said chutes for deposit in said magazine tubes, said chutes being arranged relative to said magazine tubes such that coins overflowing said magazine tubes after said magazine tubes become filled are accumulated in respective ones of said chutes, rod means swingably supporting said chutes about a common substantially horizontal axis remote from said magazine tubes such that said chutes are swingable downwardly to positions where they are operable to direct coins away from said magazine tubes, spring members associated one with each of said chutes for individually swingably biasing said chutes upwardly about said common axis to positions where they guide coins into respective ones of said magazine tubes, the biasing forces exerted by said spring member being such that said forces are overcome by the weight of a predetermined number of coins on said chutes thereby allowing said chutes to be swung downwardly under the weight of said coins to permit the accumulation of coins to slide off said chutes and be diverted away from said magazine tubes; and passage means for conveying diverted coins away from said chutes and said outlet thereby preventing an accumulation of coins on said chutes in sufficient number to clog said outlet and interfere with the displacement of said coin guide elements.

21. The fare box as defined in claim 20 wherein said rod means is a single rod mounted immediately adjacent to said outlet.

22. The fare box as defined in claim 20 wherein said passage means extends downwardly below said chutes and to the rear of said change receiver, and an overflow tray for receiving diverted coins passing downwardly through said passage means and being mounted below said change receiver for making the diverted coins readily available to the fare box operator.

23. A coin handling apparatus including a sorter comprising: structural means with sides and parallel front and rear walls providing a substantially vertical coin passage having a top inlet end and a bottom end with plural outlets; a plurality of shiftable coin guide members disposed between said front and rear walls and extending from adjacent said bottom end to adjacent said top end; means independently pivotally mounting each of said guide members at the lower ends thereof; independent resilient biasing means secured to associated ones of said guide members to force each of said members when in a released condition, to pivot about its lower end toward one of said sides; powered means for shifting all of said guide members about their pivoted lower ends to a preset condition toward the other of said sides; shiftable means for latching all of said guide members in said pre-set condition; and means including said shiftable means for sequentially releasing one or more of said pre-set latched guide members, in order starting with said guide member closest to said one side, depending upon the denominational nature of a coin to be introduced into said inlet.

24. A coin handling apparatus including a sorter comprising: structural means with sides and parallel front and rear walls providing a substantially vertical coin passage having a top inlet end and a bottom end with plural outlets; a plurality of independently shiftable coin guide members disposed between said front and rear walls and extending from adjacent said bottom end to adjacent said top end; means independently shiftably mounting each of said guide members on said structural means; independent resilient biasing means secured to associated ones of said guide members to force each of said members, when in a released condition, to shift toward one of said sides; powered means for shifting all of said guide members to a pre-set condition toward the other of said sides; shiftable latch means for latching all of said guide members in said pre-set condition; and means including said latching means for sequentially releasing one or more of said pre-set latched guide members, in order starting with said guide member closest to said one side, depending upon the denominational nature of a coin in said coin handling apparatus prior to being introduced into said inlet.

25. A coin handling apparatus as defined in claim 24, wherein said means for releasing said pre-set latched guide means comprises: a coin gauging means with linkage means having magnitudes of shifting movement proportional to coin diameter, connecting to said latch means to shift said latch means through a distance proportional to coin diameter; said latch means including a latching abutment for each of said guide members and each abutment in consecutive order from said one side remains in latching engagement for a greater increment of movement of said linkage means than does the preceding abutment.

26. A coin handling apparatus as defined in claim 25, wherein a common drive means is provided to drive said gauging means through a cycle of gauging operation and to furnish power to operate said sorter; said gauging device including means rendered operative by receipt of a coin to initiate its cyclic operation and cause said shifting movement of said linkage means; said power means including a time correlated drive means connected to said gauging means and to said sorter powered means to assure pre-set, latched disposition of all said guide members prior to initiation of shifting movement of said linkage means during a gauging cycle.

27. A coin handling apparatus comprising: a coin sorter with a plurality of individually shiftable, plural sorting walls separately displaceably mounted to define a plurality of upstanding coin passages; a coin gauger having a shiftable means, a coin inlet portion, a coin outlet portion above said sorter located so a coin egressing from said outlet portion will drop into said sorter and means to feed a coin through a cycle of movement from said inlet portion to and out from said outlet portion and to accomplish gauging of said coin during said cycle of movement; a common power means; time coordinated means connecting said power means to said sorter and to said gauger feed means and operatively connecting said shifting gauging means to said sorting walls and responsive to coin diameter of a coin each time a coin passes through a gauging cycle to provide and assure maintenance of a desired one of a plurality of coin passages corresponding to the gauged coin through said sorter for a sufficient time period to assure passage of the coin from said outlet portion to and through said sorter.

References Cited by the Examiner

UNITED STATES PATENTS

| | | | |
|---|---|---|---|
| 270,968 | 1/83 | Merriam | 133—3 |
| 1,081,958 | 12/13 | Grey | 133—3 |
| 2,271,397 | 1/42 | McDermott. | |
| 2,519,357 | 8/50 | Daughterty | 133—3 |
| 2,685,406 | 8/54 | Haas | 133—5 |
| 3,040,887 | 6/62 | Cornelison | 133—3 X |

FOREIGN PATENTS 4,376 of 1905 Great Britain.

SAMUEL F. COLEMAN, *Primary Examiner.*

ERNEST A. FALLER, Jr., *Examiner.*

UNITED STATES PATENT OFFICE
CERTIFICATE OF CORRECTION

Patent No. 3,199,517 August 10, 1965

Albert S. Wheelbarger

It is hereby certified that error appears in the above numbered patent requiring correction and that the said Letters Patent should read as corrected below.

Column 5, line 73, for "whch" read -- which --; column 7, line 19, for "Leaves" read -- Levers --; line 26, strike out "upon"; column 11, line 45, for "158" read -- 258 --; column 12, line 30, for "fingers" read -- finger --; column 15, line 56, after "and" insert -- which --; column 17, line 73, for "and", second occurrence, read -- as --; column 18, line 59, for "counter" read -- counter- --; column 21, lines 31 and 35, for "22", each occurrence, read -- 222 --; line 60, after "novel" insert -- spring --; line 68, after "one" insert -- end --; column 22, line 55, after "enters" insert -- recess --.

Signed and sealed this 19th day of April 1966.

(SEAL)
Attest:

ERNEST W. SWIDER
Attesting Officer

EDWARD J. BRENNER
Commissioner of Patents